(12) United States Patent
Kitamura et al.

(10) Patent No.: US 7,308,528 B2
(45) Date of Patent: Dec. 11, 2007

(54) VIRTUAL TAPE LIBRARY DEVICE

(75) Inventors: Manabu Kitamura, Yokohama (JP); Takashi Oeda, Sagamihara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 10/703,309

(22) Filed: Nov. 7, 2003

(65) Prior Publication Data

US 2005/0033911 A1    Feb. 10, 2005

(30) Foreign Application Priority Data

Aug. 4, 2003    (JP)    ............................. 2003-205611

(51) Int. Cl.
*G06F 12/00* (2006.01)

(52) U.S. Cl. .......................................... 711/111; 711/4

(58) Field of Classification Search ..................... None
See application file for complete search history.

(56) References Cited

U.S. PATENT DOCUMENTS

| | | | |
|---|---|---|---|
| 5,297,124 A | | 3/1994 | Plotkin et al. |
| 5,530,819 A | * | 6/1996 | Day et al. ....................... 711/4 |
| 5,596,707 A | * | 1/1997 | Ohta .............................. 714/6 |
| 5,802,398 A | | 9/1998 | Liu et al. |
| 5,805,864 A | * | 9/1998 | Carlson et al. ............... 703/24 |
| 6,070,224 A | | 5/2000 | LeCrone et al. |
| 6,128,698 A | | 10/2000 | Georgis |
| 6,311,193 B1 | * | 10/2001 | Sekido ....................... 707/202 |
| 6,341,329 B1 | * | 1/2002 | LeCrone et al. ............ 711/112 |
| 6,397,308 B1 | * | 5/2002 | Ofek et al. .................. 711/162 |
| 6,490,648 B1 | * | 12/2002 | Kaneda et al. .................. 711/4 |
| 6,496,791 B1 | | 12/2002 | Yates et al. |
| 6,496,901 B1 | | 12/2002 | De Martine et al. |
| 6,529,996 B1 | | 3/2003 | Nguyen et al. |
| 6,557,073 B1 | | 4/2003 | Fujiwara et al. |
| 6,625,704 B2 | | 9/2003 | Winokur |
| 6,636,942 B2 | | 10/2003 | Greco |

(Continued)

FOREIGN PATENT DOCUMENTS

EP    0981091 A2    2/2000

(Continued)

OTHER PUBLICATIONS

C. J. Conti, et al "Structural Aspects of the System/360 Model 85" IBM Systems Journal, vol. 7, No. 1, 1968, pp. 2-14.

(Continued)

*Primary Examiner*—Mano Padmanabhan
*Assistant Examiner*—Thanh D. Vo
(74) *Attorney, Agent, or Firm*—Mattingly, Stanger, Malur & Brundidge, P.C.

(57) ABSTRACT

A storage device system comprises interfaces connected to computers, a plurality of magnetic disks, and a control device that controls the plurality of magnetic disks. When a command from one of the computers instructing a tape library device to load a magnetic tape into a tape device is received by one of the interfaces, the control device selects a storage region that is managed as a virtual tape from among storage regions of the magnetic disks. When one of the interfaces receives an access request from the computer to the tape device, the control device controls to access the storage region selected.

20 Claims, 16 Drawing Sheets

U.S. PATENT DOCUMENTS

| | | |
|---|---|---|
| 6,816,957 B1 * | 11/2004 | Halladay et al. ............ 711/170 |
| 6,834,324 B1 | 12/2004 | Wood |
| 6,851,031 B2 * | 2/2005 | Trimmer et al. ............ 711/161 |
| 6,865,045 B2 * | 3/2005 | Kuriyama et al. ............ 360/60 |
| 2002/0144044 A1 | 10/2002 | Moon et al. |
| 2003/0084240 A1 | 5/2003 | Torrey et al. |
| 2003/0120676 A1 | 6/2003 | Holavanahalli et al. |
| 2003/0169527 A1 * | 9/2003 | Hanagata et al. ............ 360/61 |
| 2004/0044863 A1 | 3/2004 | Trimmer et al. |
| 2004/0148458 A1 * | 7/2004 | Sekine et al. ............... 711/111 |

FOREIGN PATENT DOCUMENTS

| | | |
|---|---|---|
| JP | 2000-242437 | 9/2000 |
| JP | 2002-007304 | 1/2002 |
| WO | 0227462 | 4/2002 |

OTHER PUBLICATIONS

U.S. Appl. No. 09/606,050.

* cited by examiner

Figure 3:
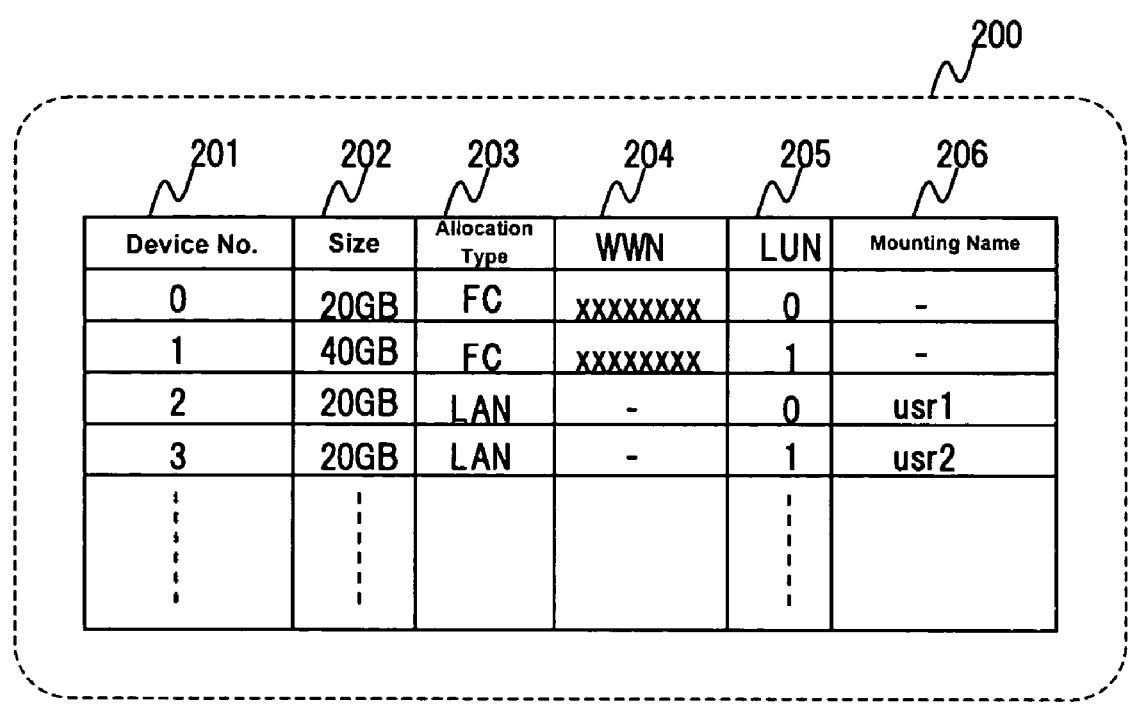

| Device No. | Size | Allocation Type | WWN | LUN | Mounting Name |
|---|---|---|---|---|---|
| 0 | 20GB | FC | xxxxxxxx | 0 | - |
| 1 | 40GB | FC | xxxxxxxx | 1 | - |
| 2 | 20GB | LAN | - | 0 | usr1 |
| 3 | 20GB | LAN | - | 1 | usr2 |
| ⋮ | ⋮ | | | ⋮ | |

| Tape No. 211 | Slot No. 212 | Size 213 | Device No. 214 | Start LBA 215 | End LBA 216 | Pointer 217 | option 218 |
|---|---|---|---|---|---|---|---|
| 1 | 0 | 20GB | 101 | 0 | 0x27FFFFFF | 0 | |
| 2 | 1 | 20GB | 101 | 0x2800000 | 0x4FFFFFFF | 0x4000000 | |
| 3 | 2 | 20GB | 102 | 0 | 0x27FFFFFF | 0x1000000 | |
| 4 | 3 | 20GB | 102 | 0x2800000 | 0x4FFFFFFF | 0x2800000 | |
| 0 | 4 | | | ----- | | | |
| 0 | n | | | | | | |

VIRTUAL TAPE LIBRARY DEVICE

BACKGROUND OF THE INVENTION

1. Field of the Invention

The present invention relates to a storage device system used in information processing systems and computer systems, and especially to a virtual tape device and a virtual tape library device.

2. Related Background Art

Generally in computer systems, two types of storage media, magnetic disks and magnetic tapes, are used for data storage. Magnetic disks are devices in which data recorded at specified positions on magnetic disk devices can be directly accessed (i.e., random access), and are therefore used to record frequently used data. On the other hand, magnetic tapes are storage media in which data is written and read only in sequence from the beginning of the tapes (i.e., sequential access), and have therefore been used primarily for backup of data recorded on magnetic disks or for archiving old data to be stored long-term. The main reason for using magnetic tapes for backup and archiving purposes is that the bit cost of magnetic tapes is cheaper than that of magnetic disks, so that it costs less to store a large amount of data.

However, in recent years a rapid rise in the amount of data handled in computer systems has caused backup and restore processing to and from magnetic disks and magnetic tapes to take longer, such that making backups on magnetic tapes is beginning to be impractical. Backups are normally made when online operations do not take place, such as at night (off-line period); however, due to the fact that backups are taking too much time, there are instances where backup processing is not completed during off-line period. Furthermore, since the bit cost of magnetic disks are falling and approaching the bit cost of magnetic tapes, methods for using magnetic disks to store backup data are beginning to be considered.

For example, a device that uses a magnetic disk device and emulates a tape device has been proposed. With this device, when a command for the tape device is received from a host computer, the command is converted to a command for the magnetic disk, and data on the magnetic disk is accessed, such that the magnetic disk device can be used as a tape device. Such a device is called a virtual tape device.

The purpose of a virtual tape device is to be able to have such uses as making backups on virtual tape devices in existing computer environments that formerly used conventional tape devices, by replacing the conventional tape devices with virtual tape devices and without making any changes to host computers or backup software.

However, in such actual uses as making backups, a tape library device that maintains and manages a plurality of magnetic tapes also manages backups in many computer environments. In a backup operation to backup data that are distributed across a plurality of magnetic tapes, backup software operates the tape library device and thereby loads magnetic tapes into tape devices and replaces magnetic tapes without any human intervention. Consequently, in order to perform a backup processing that actually utilizes virtual tape devices in computer systems, a virtual library mechanism that realizes processing for loading virtual tape media into virtual tape devices and replacing virtual tapes is required.

The conventional technology teaches how to emulate a tape device but does not teach any technology regarding library mechanism, such as the operation of a library changer robot.

Furthermore, the virtual tape device only has functions of a tape device and cannot be used as a disk device. As a result, when making backups, data must be backed up on a virtual tape device from another disk device via a host computer. Consequently, even if the access speed of the magnetic disk is slightly faster than the access speed of the magnetic tape device, the backup speed does not improve significantly. Tape devices have reached higher read/write speeds especially in recent years, and this has made the performance of the tape devices comparable to the sequential read/write performance of disk devices. Consequently, even if a virtual tape device were used in place of a tape device, there would not be significant advantages in terms of performance.

SUMMARY OF THE INVENTION

The present invention relates to a device that realizes an emulation of a library device.

The present invention also relates to a storage device system having both the functions of a magnetic disk and a virtual tape library.

The present invention further relates to a storage device system that can perform a faster backup processing.

A storage device system in accordance with an embodiment of the present invention includes interfaces connected to computers, a plurality of magnetic disks, and a control device that controls the plurality of magnetic disks. When a command from one of the computers instructing a tape library device to load a magnetic tape into a tape device is received by one of the interfaces, the control device selects a storage region within one of the magnetic disks; and when one of the interfaces receives an access request from the computer to the tape device, the control device controls to access the storage region selected.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 3 shows a diagram of an example of a disk management table 200.

FIG. 4 shows a diagram of an example of a virtual tape management table 210.

DESCRIPTION OF PREFERRED EMBODIMENTS

Figure 1:
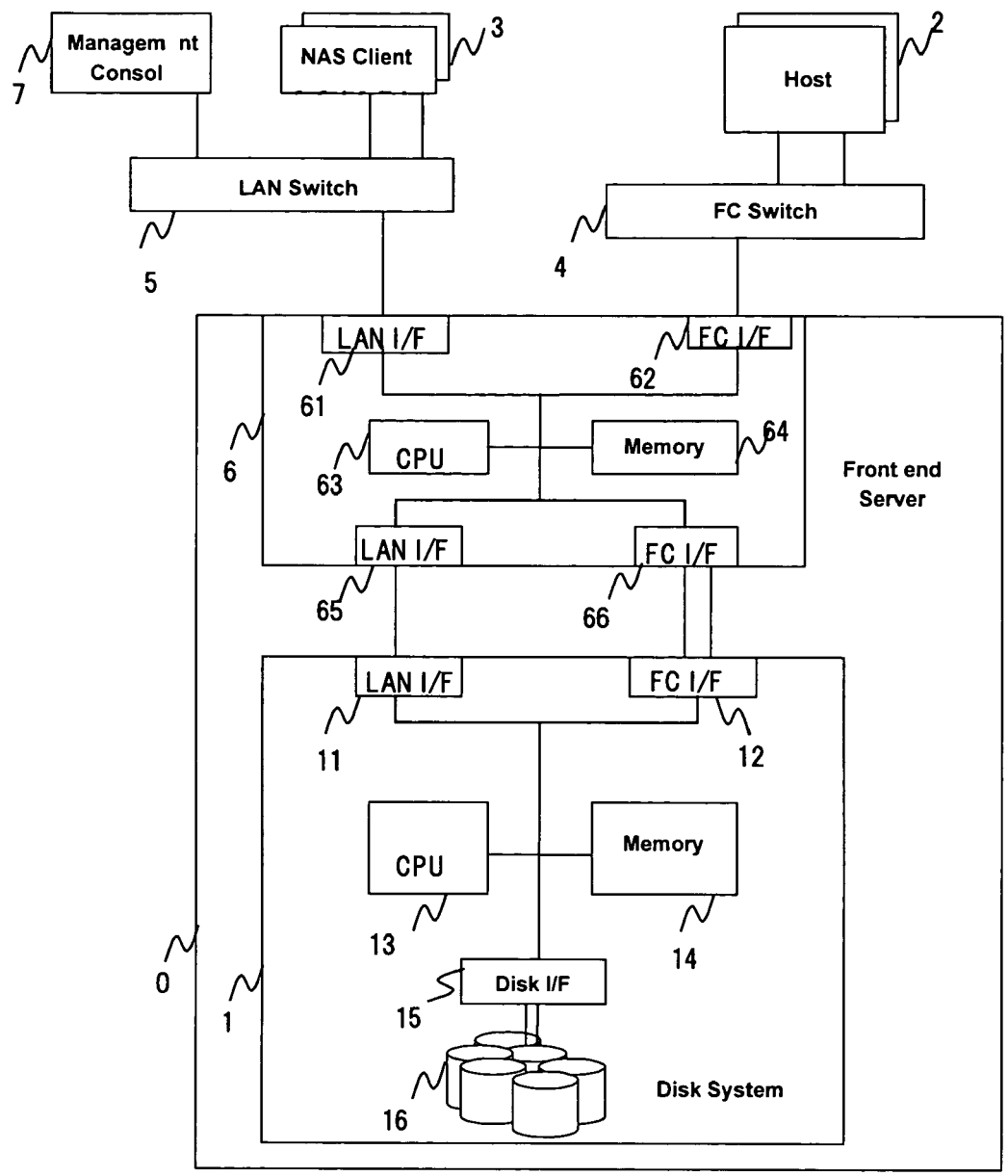
FIG. 1 shows a block diagram of an example of the configuration of a computer system in accordance with an embodiment of the present invention.

FIG. 1 shows an example of a computer system in accordance with an embodiment of the present invention.

A storage device system 0 includes a disk system 1 and a front end server 6.

The disk system 1 includes a network interface 11 (abbreviated "LAN I/F" in the drawing), a Fibre Channel interface 12 (abbreviated "FC I/F" in the drawing), a CPU 13, a memory 14, a disk interface 15 (abbreviated "disk I/F" in the drawing), and one or more disks 16. The disk system 1 is connected to the front end server 6 via the network interface 11 and the Fibre Channel interface 12.

The front end server 6 includes a network interface 61 connected to LAN, a network interface 65 connected to the disk system 1, a Fibre Channel interface 62 connected to a Fibre Channel switch, a Fibre Channel interface 66 connected to the disk system 1, a CPU 63 and a memory 64. The network interface 61 is connected to one or more NAS client computers (hereinafter also called "NAS clients") 3 via a LAN switch 5 and provides file access service to the NAS clients 3. The Fibre Channel interface 62 is connected to a plurality of host computers (hereinafter also called "hosts") 2 via a Fibre Channel switch 4 (abbreviated "FC switch" in the drawing) and provides disk access and tape access processing to the hosts 2.

A management console 7 is connected to the front end server 6 via the LAN switch 5 and the network interface 61 and performs setting processing of the front end server 6, as well as setting processing of the disk system 1 via the network interface 65 and the network interface 11. The details of the setting processing will be described later.

The front end server 6 receives disk access requests, tape access requests and file access requests from the hosts 2 and the NAS clients 3, reads data from the disk system 1, and writes data to the disk system 1. Programs for performing such processing are stored in the memory 64 and executed by the CPU 63.

The disk system 1 primarily receives disk access requests from the front end server 6 and executes processing accordingly. Programs required for processing executed by the disk system 1 are stored in the memory 14 and executed by the CPU 13. In addition to storing programs operated by the CPU 13, the memory 14 also serves as a cache memory for temporarily storing write data received from the hosts 2 and/or NAS clients 3 via the front end server 6. The disk interface 15 is an interface that uses such protocols as SCSI (Small Computer Systems Interface) or Fibre Channel, and the CPU 13 accesses the disks 16 via the disk interface 15.

Each of the disks 16 may be a physical magnetic disk drive or in a form that appears to be a single logical disk drive but consisting of a plurality of magnetic disk drives, such as a disk array device. In the description according to the present embodiment, each of the disks 16 is assumed to be a logical disk; unless otherwise noted, the term "disk" means a logical disk hereafter. Physical disks such as individual magnetic disks will be described as physical disks.

Figure 2:
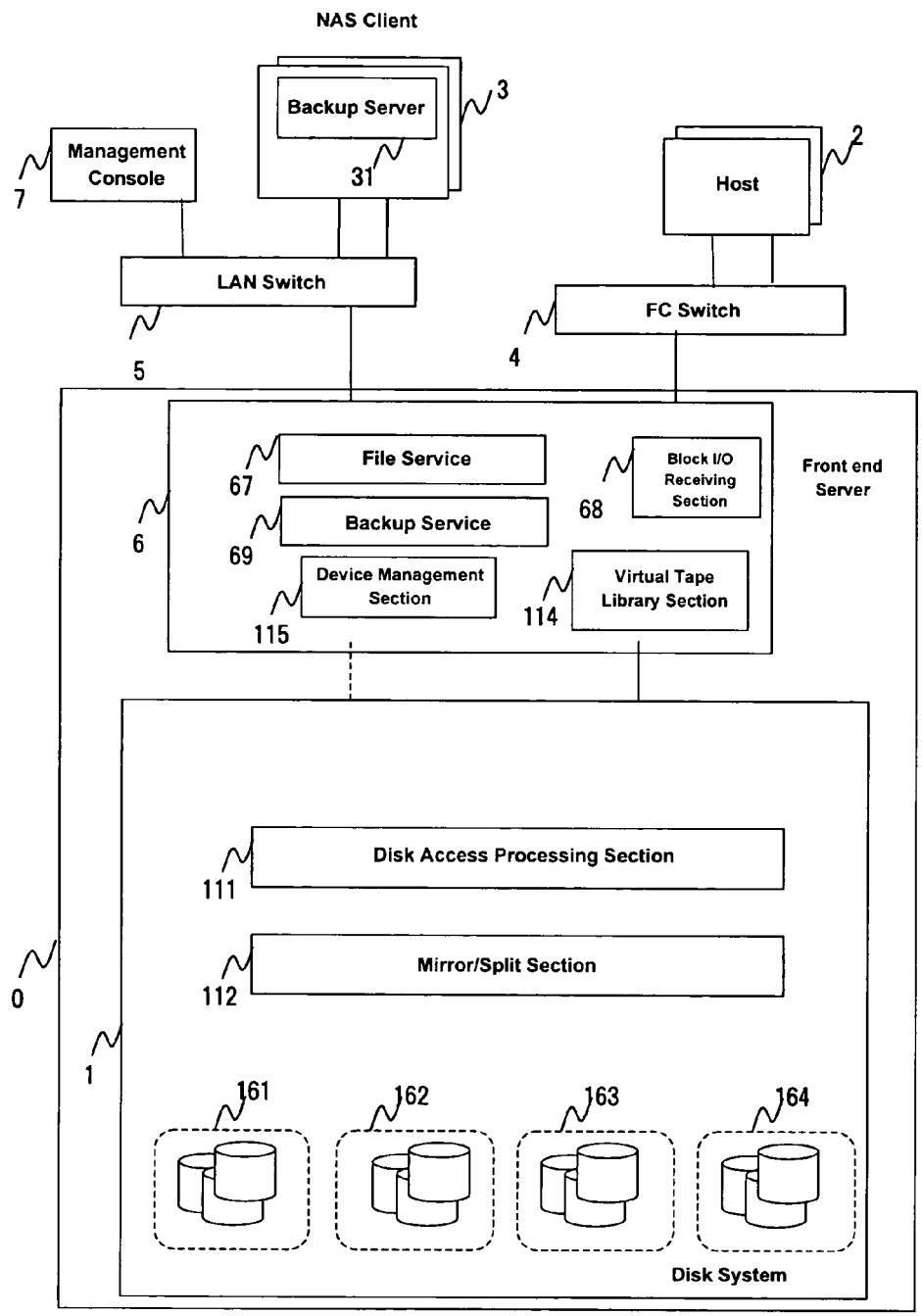
FIG. 2 shows a block diagram of an example of the logical configuration of the computer system in accordance with the embodiment of the present invention.

FIG. 2 shows an example of the logical configuration of the storage device system 0. The following mainly describes the contents of programs operated by the CPU 13 and the CPU 63.

A file service 67 is a program that provides functions of so-called NAS (Network Attached Storage); it manages files on the disks 16 and is executed when processing file access requests according to such protocols as NFS or CIFS are received from the NAS clients 3 by the front end server 6. Hereafter, data on the disks 16 managed by the file service 67 are called NAS data, and those disks 16 among all the disks 16 that store the NAS data are called NAS devices.

A backup service 69 is a program that specializes in backup processing of NAS data; it operates in response to backup/restore requests received by the front end server 6 from backup servers 31 of the NAS clients 3.

A block I/O receiving section 68 receives disk access requests, tape access requests and library control requests from the hosts 2; if a request is a disk access request, the block I/O receiving section 68 simply transfers the processing to the disk system 1; if a request is a tape access request or a library control request, the block I/O receiving section 68 transfers the processing to a virtual tape library section 114.

The virtual tape library section 114 receives commands for a tape device or a library device from the block I/O receiving section 68 and performs a processing for the command received. For example, if the virtual tape library section 114 receives a command requesting data read from a tape, the virtual tape library section 114 converts the command into a read command for a disk, issues a read request for the disks 16 to the disk system 1, receives read data from the disk system 1, and sends the read data to the block I/O receiving section 68.

A device management section 115 correlates the disks 16 to virtual tapes and prepares virtual tape devices and virtual library devices. The device management section 115 manages the disks 16 by dividing the disks 16 into four groups: a disk device group 161, a file system group 162, a virtual tape device group 163, and an unallocated device group 164. The disk device group 161 is a collection of disks accessed as magnetic disks by the hosts 2; the file system group 162 is a collection of disks storing NAS data, or a collection of NAS devices; the virtual tape device group 163 is a collection of disks storing data accessed when access requests for data on tapes are received from the hosts 2, i.e., a collection of disks that serve as virtual tapes to store data accessed; and the unallocated device group 164 is a collection of disks that do not belong to any of the previous three groups, or a collection of unused disks. Hereinafter, disks that belong to the disk device group 161 are called "disk devices."

The file service 67 and the backup service 69 are stored in the memory 64 of the front end server 6, and are programs executed by the CPU 63. The block I/O receiving section 68, the device management section 115, and the virtual tape library section 114 are realized when corresponding programs stored in the memory 64 of the front end server 6 are executed by the CPU 63.

A disk access processing section 111 of the disk system 1 receives access requests to the disks 16 from the front end server 6 via the Fibre Channel interface 12, and performs read/write processing to and from the disks 16.

A mirror/split section 112 executes processing to create a copy of data stored on one of the disks 16 or a copy of data stored in a part of storage regions of one of the disks 16, and to store the data copy on another disk 16 within the disk system 1. In other words, when the mirror/split section 112 receives a copy instruction, data that was stored on the disk 16 that is the target of the instruction at the time the copy instruction was received (i.e., snapshot data) is copied and stored on a different disk 16. In the disk system 1, data can be read and/or written even during the copy operation. Known methods may be used for realizing the reception of data read or write commands while obtaining snapshot data.

The disk access processing section 111 and the mirror/split section 112 are realized when corresponding programs stored in the memory 14 of the disk system 1 are executed by the CPU 13.

Next, referring to FIGS. 3 through 6, information managed by the device management section 115 and the virtual tape library section 114 will be described.

First, FIG. 3 is a diagram of an example of a disk management table 200, which manages disks that belong to either the disk device group 161 or the file system group 162. The disk system 1 assigns a unique identifier to each of the disks 16 to manage the disks 16. Identifiers used are integer values of 0 or greater. Such identifiers are called device numbers.

In each row of the disk management table 200 are a device number 201, a size 202, an allocation type 203, a WWN 204, and an LUN 205 for the corresponding disk 16. The size 202 indicates the size of the disk 16 that corresponds to the device number 201. The allocation type 203 indicates which of the disk device group 161 and the file system group 162 each disk 16 belongs to; the disks 16 that belong to the disk device group 161 are assigned an identifier "FC," while disks 16 that belong to the file system group 162 are assigned an identifier "LAN," in order to manage the disks 16.

The WWN 204 and the LUN 205 are WWN (World Wide Name) and LUN (Logical Unit Number), respectively, assigned to each disk 16; these are used when accessing the disks 16 from the hosts 2 and when the block I/O receiving section 68 of the front end server 6 accesses the disks 16. According to this embodiment, the WWN designated when the hosts 2 access the disks 16 and the WWN designated when the front end server 6 accesses the disks 16 have the same value. The WWNs may be different in another embodiment of the present invention; in such a case, the WWN designated when the hosts 2 access the disks 16 and the WWN designated when the front end server 6 accesses the disks 16 shall both be managed by the disk management table 200.

A mounting name 206 is a directory name designated when the NAS clients 3 mount NAS devices; the mounting name 206 relates only to disks 16 that belong to the file system group 162. For this reason, in rows for disks 16 that belong to the disk device group 161, no values are entered under the mounting name 206.

FIG. 4 is an example of a virtual tape management table 210 that manages disks 16 that belong to the virtual tape device group 163.

Before describing the virtual tape management table 210, a general tape library device is first described. A tape library device comprises a plurality of slots to store magnetic tapes, a robot that carries magnetic tapes from the slots to a tape device or from the tape device to the slots, and the tape device (hereinafter also called a "tape drive") in which the magnetic tapes are loaded. There may be one or more each of the tape device and the robot in one tape library device. In the tape library devices, identification information is assigned to each magnetic tape and each slot in order to uniquely specify each magnetic tape and each slot. The identification information assigned to each magnetic tape is called a "volume tag," and the identification information assigned to each slot is called an "element address."

According to the embodiment of the present invention, magnetic disks are used in place of actual magnetic tapes, and the disks are used to emulate magnetic tapes. The emulated magnetic tapes are called "virtual tapes." According to the present embodiment, the slots, the robots and the tape devices are also emulated by the storage device system 0, such that the storage device system 0 can behave as a tape library device. A tape library device emulated by the storage device system 0 in this manner is called a "virtual tape library device." In the virtual tape library device, when a write command and write data are sent from one of the hosts 2 to a tape device, the write data is stored in a designated region of one of the disks 16 that corresponds to the virtual tape designated in the write command. According to the present embodiment, the identification information assigned to each virtual tape is called a tape number 211, and the identification information assigned to each slot is called a slot number 212.

The storage device system 0 emulates one or more tape library devices and has one virtual tape management table 210 for each virtual tape library device. In each row of the virtual tape management table 210 are the tape number 211, the slot number 212, a size 213, a device number 214, a start LBA 215, an end LBA 216, a pointer 217, and an option flag 218.

The tape number 211 is the identification information created by the virtual tape library section 114 for each virtual tape. The slot number 212 is the number created by the virtual tape library section 114 and assigned to each slot of the virtual tape library device. The tape number 211 assigned to each virtual tape is an integer value of 1 or greater; if the tape number 211 column of the virtual tape management table 210 is 0, this indicates that no tape is stored in the slot that corresponds to the row. In each row whose value in the tape number 211 column is not 0, the virtual tape identified by the tape number 211 is stored in the slot with the number indicated in the corresponding slot number 212.

The size 213 indicates the capacity of the corresponding virtual tape. The device number 214 indicates the device number assigned to the disk 16 that actually stores data of the corresponding virtual tape; the start LBA 215 and the end LBA 216 indicate which region of the disk 16 indicated by the device number is used to emulate the corresponding virtual tape. The start LBA 215 indicates a head address of the storage region of the disk 16 that emulates the corresponding virtual tape, while the end LBA 216 indicates an end address thereof.

The pointer 217 indicates the position (LBA) at which data read/write begins when a read or write request is made to the corresponding virtual tape. In sequential access devices such as tape devices, the LBA of data to be accessed is not designated in read or write commands as in disks and data is instead accessed sequentially from the beginning of the tape. Consequently, whenever an access to a virtual tape ends, the last position to which the access was made must be recorded for the virtual tape; the pointer 217 is used for this purpose. Lastly, the option flag 218 is used on virtual tapes storing backup data of NAS data, and its specific usage will be described later.

Figure 5:
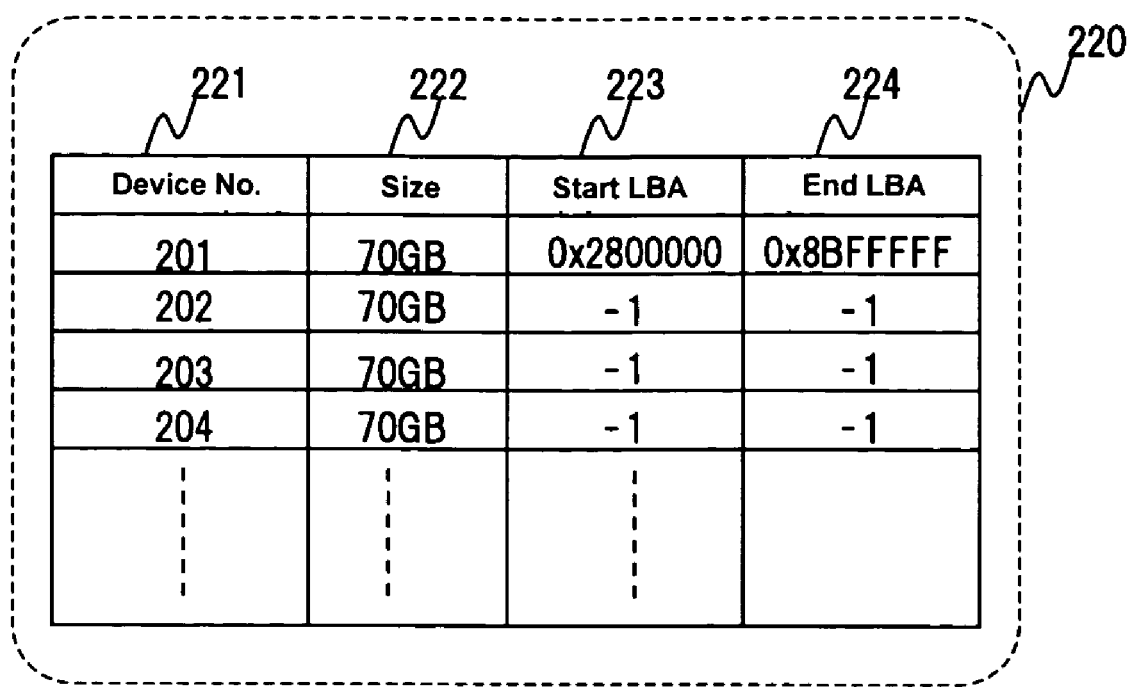
FIG. 5 shows a diagram of an example of an unallocated device management table 220.

FIG. 5 is a diagram of an example of an unallocated device management table 220, which manages disks 16 that belong to the unallocated device group 164. In each entry of the unallocated device management table 220 stores a device number 221, a size 222, a start LBA 223 and an end LBA 224 for the corresponding disk 16. The size 222 indicates the capacity of the disk 16 that corresponds to the device number 221, and the start LBA 223 and the end LBA 224 indicate regions not used as virtual tapes on the corresponding disk 16. In other words, according to the present embodiment of the present invention, a plurality of virtual tapes may be allocated to one disk 16. Furthermore, storage regions used as virtual tapes and unallocated storage regions may coexist on one disk 16. For each disk 16 in which no region is used, −1 is entered for both the start LBA 223 and the end LBA 224.

Figure 6:
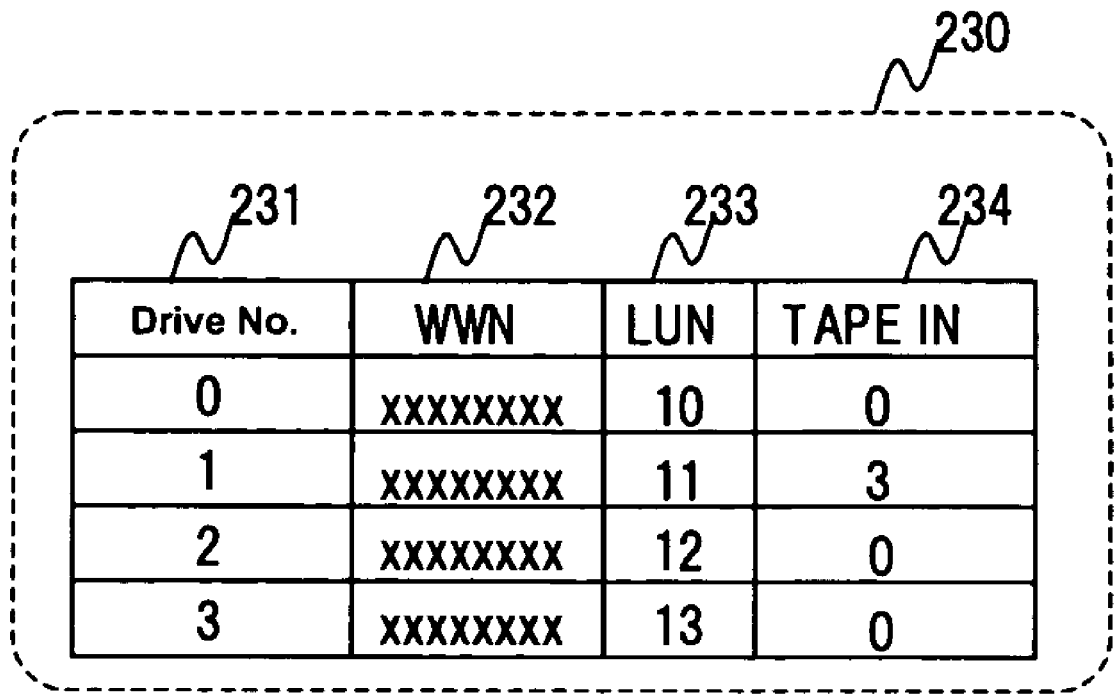
FIGS. 6(*a*) and 6(*b*) show a diagram of examples of a virtual tape drive table 230 and a virtual robot table 240, respectively.
Figure 6:
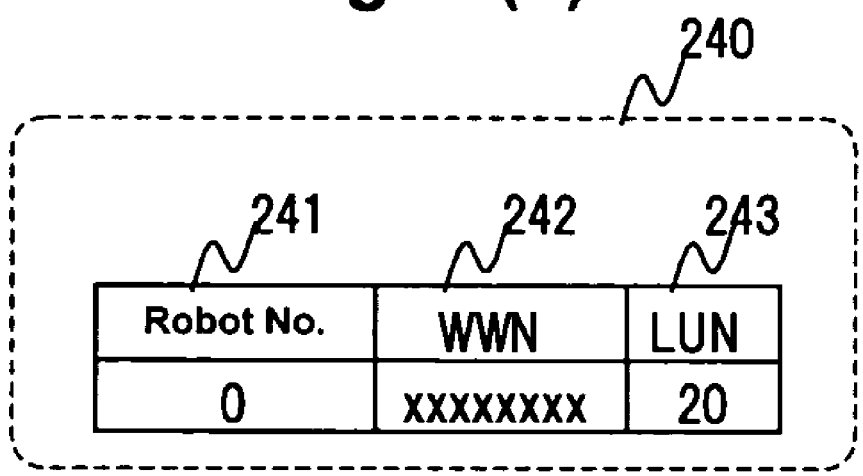

FIGS. 6(*a*) and (*b*) show diagrams of an example of a virtual tape drive table 230, which manages information regarding the virtual tape devices that are managed by the virtual tape library section 114, and an example of a virtual robot table 240, which manages information regarding the virtual robots. In the virtual tape library devices according to the present embodiment, each virtual tape device and each virtual robot has a WWN and an LUN, which allows the hosts 2 to access the virtual tape devices and the virtual robots as Fibre Channel devices.

Like the virtual tape management table 210, there are one virtual tape drive table 230 and one virtual robot table 240 created for each virtual tape library device.

First, the virtual tape drive table 230 is described. A drive number 231 is an identifier assigned to each virtual tape drive in the virtual tape library. Since there are four entries in the virtual tape drive table 230 in FIG. 6, this indicates that there are four virtual tape drives (i.e., virtual tape devices) in the virtual tape library device according to the present embodiment. A WWN 232 and an LUN 233 are a WWN and an LUN, respectively, of the corresponding virtual tape drive. A tape in 234 indicates which virtual tape is loaded when a virtual tape is loaded in the corresponding virtual tape drive. For virtual tape drives without any virtual tape loaded, 0 is entered in the corresponding entry of the tape in 234. The example in FIG. 6 indicates a situation where a virtual tape with the tape number 3 is loaded in a virtual tape drive whose drive number 231 is 1.

Next, the virtual robot table 240 is described. A robot number 241 is an identification number assigned to each virtual robot. A WWN 242 and an LUN 243 are a WWN and an LUN, respectively, of the corresponding virtual robot.

Each of the tables shown in FIGS. 3 through 6 is stored in the memory 64 of the front end server 6.

Next, referring to FIGS. 7 through 10, processing for setting or managing disks, virtual tape drives and virtual robots is described. The processing shown in FIGS. 7 through 10 begins when a user of the storage device system 0 issues instructions through the management console 7.

Figure 7:
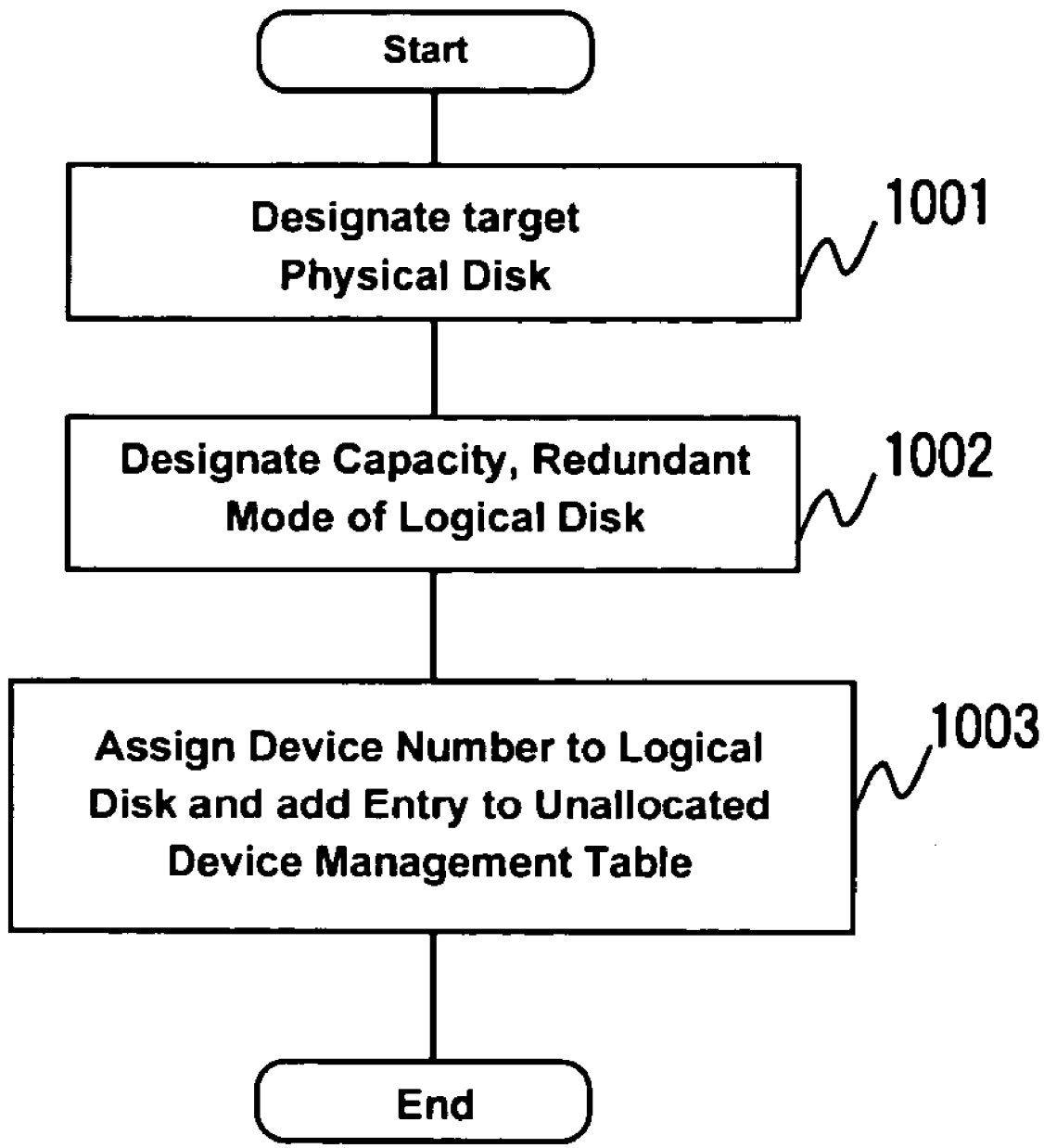
FIG. 7 shows a flowchart of an example of a processing to form a logical disk from a physical disk and to register the logical disk in an unallocated device group 164.

FIG. 7 is a diagram of an example of a processing to add a new physical disk to the disk system 1, form a logical disk from the physical disk added, and register the logical disk in the unallocated device group 164.

In the storage device system 0, all disks 16 initially belong to the unallocated device group 164. Any disk 16 added also initially belongs to the unallocated device group 164. Due to the fact that the disks 16 added to the disk system 1 are in reality physical disks, an operation to form logical disks from the physical disks must be performed first.

First, in step 1001, the user inputs from the management console 7 information for designating a physical disk added. Next, in step 1002, the user uses the management console 7 to designate the kind of logical disk to be formed from the physical disk designated in step 1001. Specifically, the capacity and redundant mode, such as RAID 1 or RAID 5, of the logical disk are designated.

When designating the logical disk in step 1002 is completed, an entry is added to the unallocated device management table 220, and the capacity of the logical disk designated is registered in the size 222 of the unallocated device management table 220. Furthermore, the value "−1" is entered in both the start LBA 223 and the end LBA 224. A device number is assigned to the logical disk and registered in the device number 221 column of the unallocated device management table 220 (step 1003). This ends the processing to register a new disk in the unallocated device group 164.

Registration of information in the unallocated device management table 220 is executed by the device management section 115 based on information inputted by the user through the management console 7. However, the device number 221, which is the identification information of the logical disk, may automatically be assigned and notified to the device management section 115 by the disk system 1, or the device number 221 may be designated by the user through the management console 7.

Figure 8:
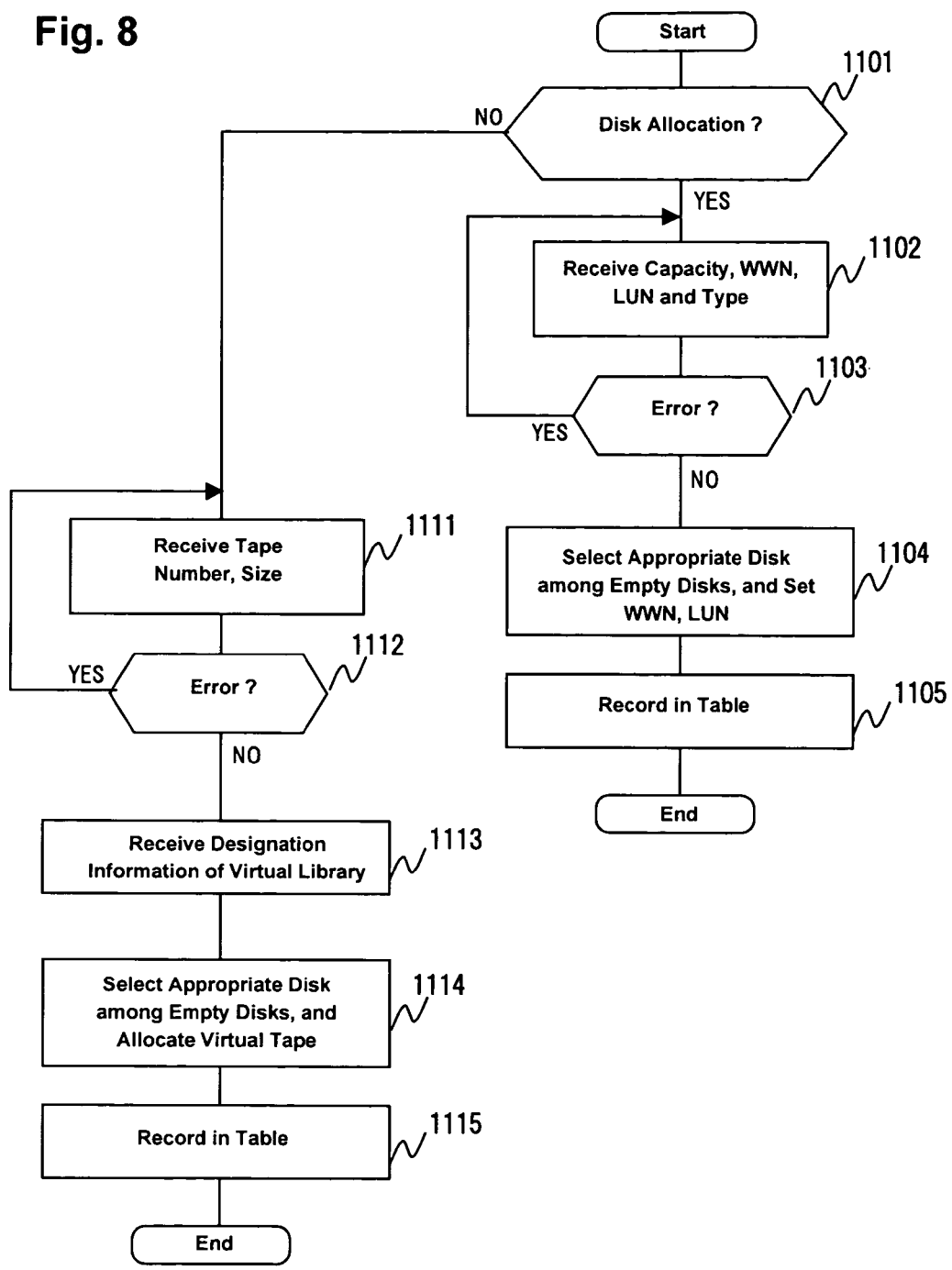
FIG. 8 shows a flowchart of an example of a processing to allocate a disk registered in the unallocated device group 164 to one of a disk device group 161, the file system group 162, and a virtual tape device group 163.

FIG. 8 is a diagram of an example of a processing to allocate one of the disks 16 registered in the unallocated device group 164 to one of the disk device group 161, the file system group 162, and the virtual tape device group 163.

First, the user designates to the storage device system 0 through the management console 7 whether the disk 16 that belongs to the unallocated device group 164 is to be allocated to one of the disk device group 161 and the file system group 162, or to the virtual tape device group 163. When the designation information is received by the storage device system 0, the device management section 115 determines whether the instruction from the user indicates the disk 16 is to be allocated as one of a disk device and NAS device, or as a virtual tape (step 1101); if it is an allocation as either a disk device or NAS device, the device management section 115 performs the processing beginning with step 1102.

In step 1102, the storage device system 0 receives from the user via the management console 7 the capacity of the disk 16 to be allocated, WWN and LUN information, and type information that indicates to which of the disk device group 161 and the file system group 162 the disk 16 that currently belongs to the unallocated device group 164 is to belong. The device management section 115 of the storage device system 0 checks to make sure that there are no problems with the designation information (step 1103); if there are no problems, the processing proceeds to step 1104. If there is any problem, such as a designation of an LUN already allocated to another disk 16, or a designation of capacity larger than the capacity of the disk 16 that currently belongs to the unallocated device group 164, such a disk device cannot be defined; consequently, the processing returns to step 1102 to have the user re-designate the capacity, WWN and LUN.

In step 1104, the device management section 115 searches the unallocated device management table 220 and selects an appropriate disk 16. The appropriate disk 16 may be a disk whose capacity is smaller than but closest to the capacity designated, for example. The device management section 115 then sets to the selected disk 16 the WWN and LUN designated in step 1102.

Next in step 1105, the device management section 115 sets in the disk management table 200 the device number of the disk 16 selected, as well as the capacity, type, WWN and LUN designated in step 1102. Furthermore, the device management section 115 deletes the entry corresponding to the disk 16 from the unallocated device management table 220 and ends the processing.

If the storage device system 0 determines in step 1101 that the user instructed the unallocated disk 16 to be allocated to the virtual tape device group 163, the device management section 115 performs the processing beginning with step 1111.

In step 1111, the storage device system 0 receives from the user via the management console 7 information regarding the number of virtual tapes to be newly allocated and their respective capacities; in step 1112, the device management section 115 checks to make sure that there are no problems with the information received. This checking is virtually identical to the processing that takes place in step 1103; if the total capacity of virtual tapes to be allocated is larger than the total capacity of the disks 16 in the unallocated device group 164, the virtual tapes cannot be formed as designated by the user; consequently, the processing returns to step 1111 to have the user re-designate the number of virtual tapes and their respective capacities.

In step 1113, the storage device system 0 receives from the user via the management console 7 the designation information regarding in which library the virtual tapes created should be entered. Due to the fact that a plurality of virtual tape libraries can be defined in the storage device system 0 and that one virtual tape management table 210 corresponds to each virtual tape library, the designation in step 1113 determines in which virtual tape management table 210 the virtual tapes are to be registered.

In step 1114, the device management section 115 searches the unallocated device management table 220 and selects the appropriate disk 16. The virtual tape library section 114 assigns tape numbers to the disk 16 selected, determines the start LBAs and end LBAs corresponding to the capacities designated by the user in step 1111, and allocates slots; in this way, the virtual tape library section 114 allocates the virtual tapes to the disk 16 selected.

In step 1115, the device management section 115 registers the tape numbers allocated to the virtual tapes in step 1114 in the virtual tape management table 210 that corresponds to the virtual tape library designated in step 1113. Furthermore, the device management section 115 registers in the virtual tape management table 210 the slot numbers allocated to the virtual tapes in step 1114, the sizes of the virtual tapes designated by the user in step 1111, the disk number of the disk 16 selected in step 1114, and the start LBAs and the end LBAs allocated in step 1114. In the pointer 217 of the virtual tape management table 210, an initial value "0" is stored. The device management section 115 updates the contents of the unallocated device management table 220 and ends the virtual tape allocation processing.

Figure 9:
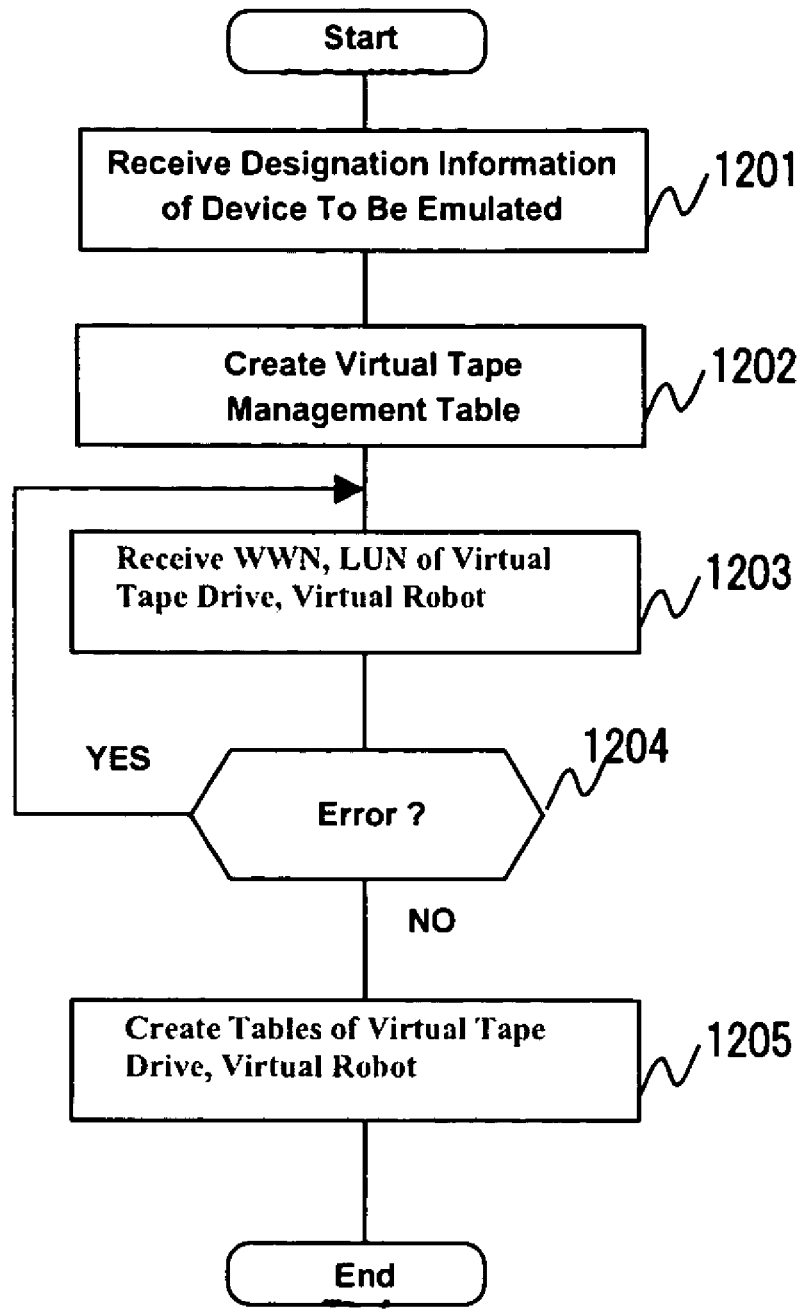
FIG. 9 shows a flowchart of an example of a processing to define a virtual tape library device.

FIG. 9 is a diagram of an example of a processing to define a virtual tape library device. In the storage device system 0, virtual tape library devices that emulate actual tape library devices can be defined. Since each tape library device has a set number of tapes and a set number of tape drives that can be stored, as well as a set number of robots, depending on the product/model of various vendors, the user must first designate the name of the device to be emulated.

In step 1201, the user through the management console 7 designates the product name/model to be emulated, and the storage device system 0 receives the information. Since this determines the number of slots, the number of tape drives and the number of robots, the virtual tape library section 114 in step 1202 creates the virtual tape management table 210 based on the name of the device to be emulated it has received. In step 1203, the user designates via the management console 7 the WWNs and LUNs of the virtual tape drives and the virtual robots, and the storage device system 0 receives the information. In step 1204, the virtual tape library section 114 checks to make sure that there are no problems with the information; if there are no problems, the virtual tape library section 114 creates the virtual tape drive table 230 and the virtual robot table 240, registers the WWNs and LUNs designated in step 1203 (step 1205), and ends the processing.

In the storage device system 0, the disks 16 that belong to the disk device group 161 or the file system group 162, and virtual tapes that are no longer necessary can be reallocated to another group. For example, when there is an increase in the amount of write data from the NAS clients 3, the disks 16 that belong to the file system group 162 must be increased in number; however, if there are no disks 16 with the capacity required in the unallocated device group 164, a part of the disks 16 registered in the virtual tape device group 163 can be transferred to the file system group 162. In this case, one of the disks 16 that belongs to the virtual tape device group 163 is registered in the unallocated device group 164 first, and the allocation processing shown in FIG. 8 is executed.

Figure 10:
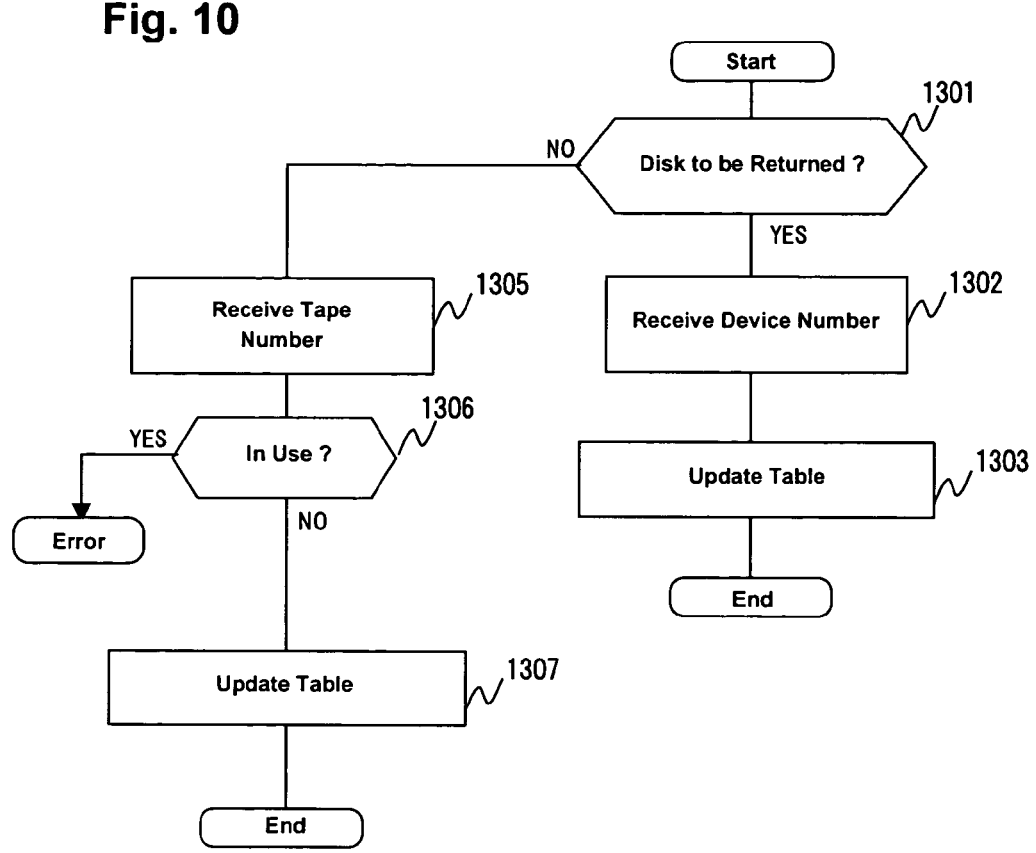
FIG. 10 shows a flowchart of an example of a processing to return a disk registered in the disk device group 161, the file system group 162 or the virtual tape device group 163 to the unallocated device group 164.

FIG. 10 is a diagram of an example of a processing by the device management section 115 to return one of the disks 16 currently registered in the disk device group 161, the file system group 162 or the virtual tape device group 163 to the unallocated device group 164.

A return request takes place when the user instructs the return to the storage device system 0 via the management console 7.

First, in step 1301, based on the input information from the user, the device management section 115 determines whether the disk 16 that belongs to one of the disk device group 161 and the file system group 162 is to be returned to the unallocated device group 164; if so, the device management section 115 receives from the user via the management console 7 the device number of the disk device or the NAS device to be returned (step 1302).

Next, the device management section 115 deletes the entry that corresponds to the device number from the disk management table 200, registers the information of the disk 16 with the device number in the unallocated device management table 220, and ends the processing (step 1303).

If it is determined in step 1301 that the disk 16 to be returned is one of the disks 16 currently being used as a virtual tape, the processing proceeds to step 1305 and the device management section 115 receives the tape number from the user via the management console 7.

Next, the device management section 115 refers to the tape in 234 column of each entry in the virtual tape drive table 230 and determines whether the virtual tape is loaded in a tape drive (step 1306). If it is loaded, the device management section 115 determines that the virtual tape is currently being used and ends the processing due to error. If the virtual tape is not loaded, the device management section 115 deletes from the virtual tape management table 210 the entry corresponding to the tape number received in step 1305, registers the disk 16 that comprises the deleted virtual tape in the unallocated device management table 220, and ends the processing (step 1307).

If the virtual tape to be returned is a virtual tape that occupies only a part of the regions of the disk 16 and if an entry corresponding to the disk 16 already exists in the unallocated device management table 220, the device management section 115 updates the start LBA 223 and the end LBA 224 of the entry corresponding to the disk 16 and ends the processing.

Figure 11:
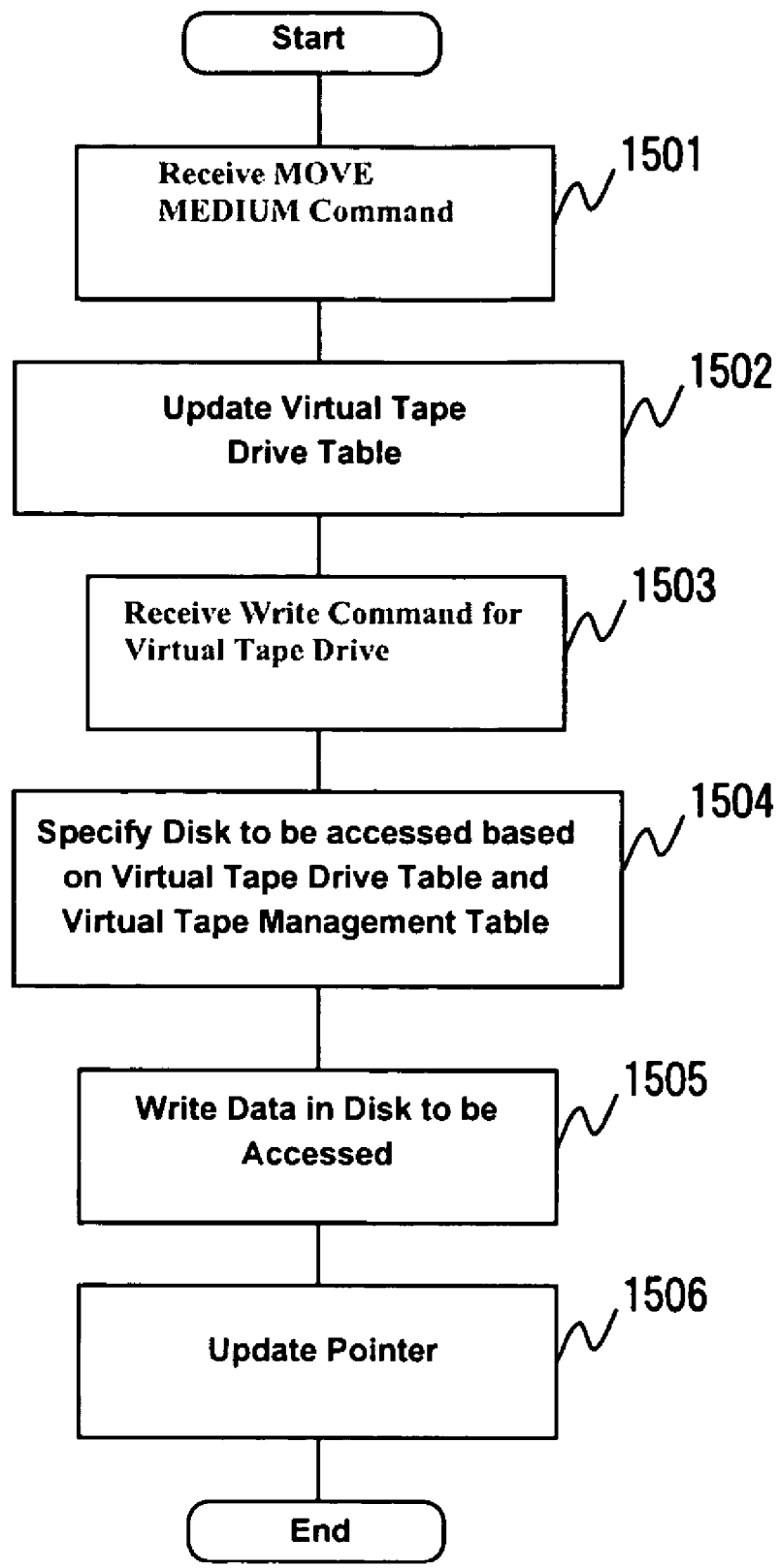
FIG. 11 shows a flowchart of an example of a processing to write data to a virtual tape library.

Using FIG. 11 and subsequent figures, a description is made as to a flow of processing that takes place when a virtual tape library device is operated by the hosts 2, as well as a flow of backup/restore processing using a virtual tape library device.

First in FIG. 11, a flow of processing that takes place when a command arrives from one of the hosts 2 to the storage device system 0 concerning an instruction to a tape drive or a robot of the tape library device, as well as a processing to write data to the virtual tape library device, is described.

The virtual tape drive and the virtual robot operate according to SCSI Stream Commands, which are commands for SCSI sequential access type devices, or SCSI Media Changer Commands, which are commands for SCSI media changer type devices, as stipulated by ANSI that the storage device system 0 receives from the hosts 2 via the Fibre Channel interface 62. FIG. 11 shows an example of processing that takes place when a command requesting a processing to load a tape into a tape drive and a command requesting a processing to write data to a tape are issued.

First in step 1501, the block I/O receiving section 68 of the storage device system 0 receives, from one of the hosts 2, a MOVE MEDIUM command, which requests a tape to be taken out of a slot in the library device and to be loaded into a tape drive. The block I/O receiving section 68 sends the MOVE MEDIUM command received to the virtual tape library section 114.

Let us assume, for example, that the MOVE MEDIUM command is a command that instructs to move the virtual tape stored in the slot whose slot number 212 is 2 in the virtual tape management table 210 in FIG. 4, i.e., the virtual tape whose tape number 211 is 3, to the virtual tape drive whose drive number 231 is 1 of the virtual tape drives managed by the virtual tape drive table 230.

In step 1502, in order to establish a state in which the virtual tape is loaded on the virtual tape drive, the virtual tape library section 114 writes 3, which is the tape number of the virtual tape to be loaded, in the tape in 234 entry of the virtual tape drive whose drive number 231 is 1 in the virtual tape drive table 230.

In step 1503, the block I/O receiving section 68 of the storage device system 0 receives from the host 2 a write command for the tape drive whose drive number is 1. Since the write command is a command for the virtual tape drive, the block I/O receiving section 68 sends the command to the virtual tape library section 114.

In step 1504 and step 1505, in order to write data on the virtual tape currently loaded in the virtual tape drive whose drive number is 1, the virtual tape library section 114 specifies the tape number of the virtual tape loaded in the virtual tape drive, and further specifies, based on the tape number, the device number of the disk 16 that corresponds to the virtual tape and the LBA at which to begin writing. The write data is written to the virtual tape beginning at the specified LBA.

Specifically, the virtual tape library section 114 first refers to the virtual tape drive table 230, and ascertains, due to the fact that 3 is written in the tape in 234 that corresponds to the virtual tape drive whose drive number 231 is 1, that data should be written to the virtual tape whose tape number is 3. Next, the virtual tape library section 114 refers to the virtual tape management table 210 and recognizes that write data should be written to the disk 16 whose device number is 102, since the device number of the disk 16, which corresponds to the virtual tape whose tape number 211 is 3, is 102 (step 1504).

In step 1505, the virtual tape library section 114 refers to the pointer 217 of the virtual tape management table 210 and determines the LBA at which to begin writing. The virtual tape library section 114 then issues a write request to the disk system 1 to write data beginning at the LBA determined. Upon receiving the write request from the virtual tape library section 114, the disk access processing section 111 writes the write data to the storage region beginning with the LBA determined of the disk 16 whose device number 214 is 102.

When the write processing is completed, the virtual tape library section 114 in step 1506 updates the value of the pointer 217 in the virtual tape management table 210 and ends the processing. In other words, the virtual tape library section 114 shifts the pointer 217 rearward by an amount equal to the size of the write data.

Next, referring to FIGS. 12 through 16, a backup/restore processing of NAS data is described.

In those disks 16 that belong to the file system group 162, file systems are formed by the file service 67 and accessed by the NAS clients 3 on a file-by-file basis. Backups of NAS data are made by the backup service 69's following instructions from the backup server 31 to back up data onto virtual tapes. In the backup processing according to the present embodiment, commands according to NDMP (Network Data Management Protocol) between the backup server 31 and the backup service 69 are used to send and receive commands and information required for the backup/restore processing; however, the execution of the backup processing is not limited to this mode. The NDMP stipulates a method for the backup server 31 and the backup service 69 to communicate with each other via LAN in order to send and receive SCSI commands for controlling tape drives and library robots, and a command format regarding backup/restore commands.

Figure 12:
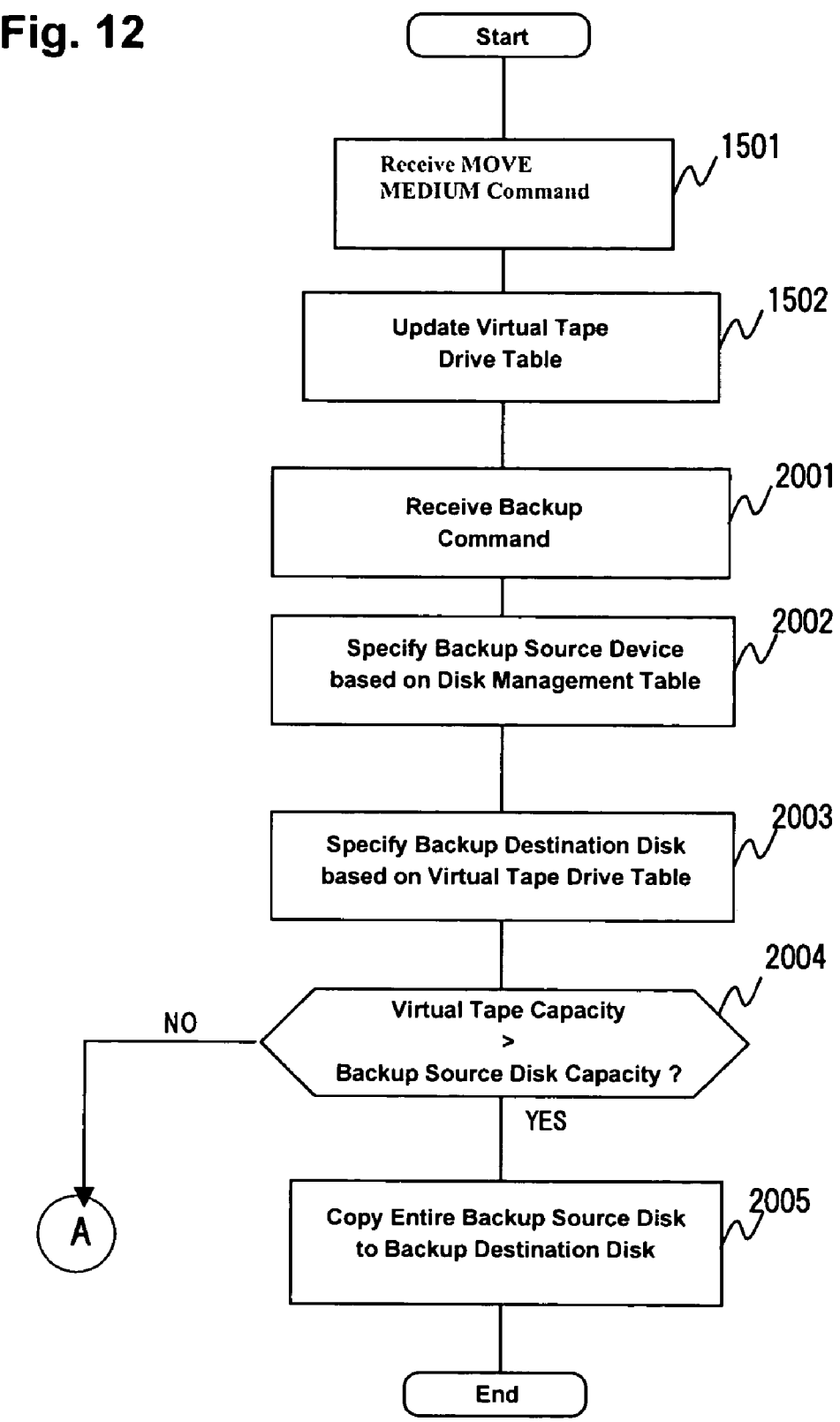
FIG. 12 shows a flowchart of an example of a backup processing.
Figure 13:
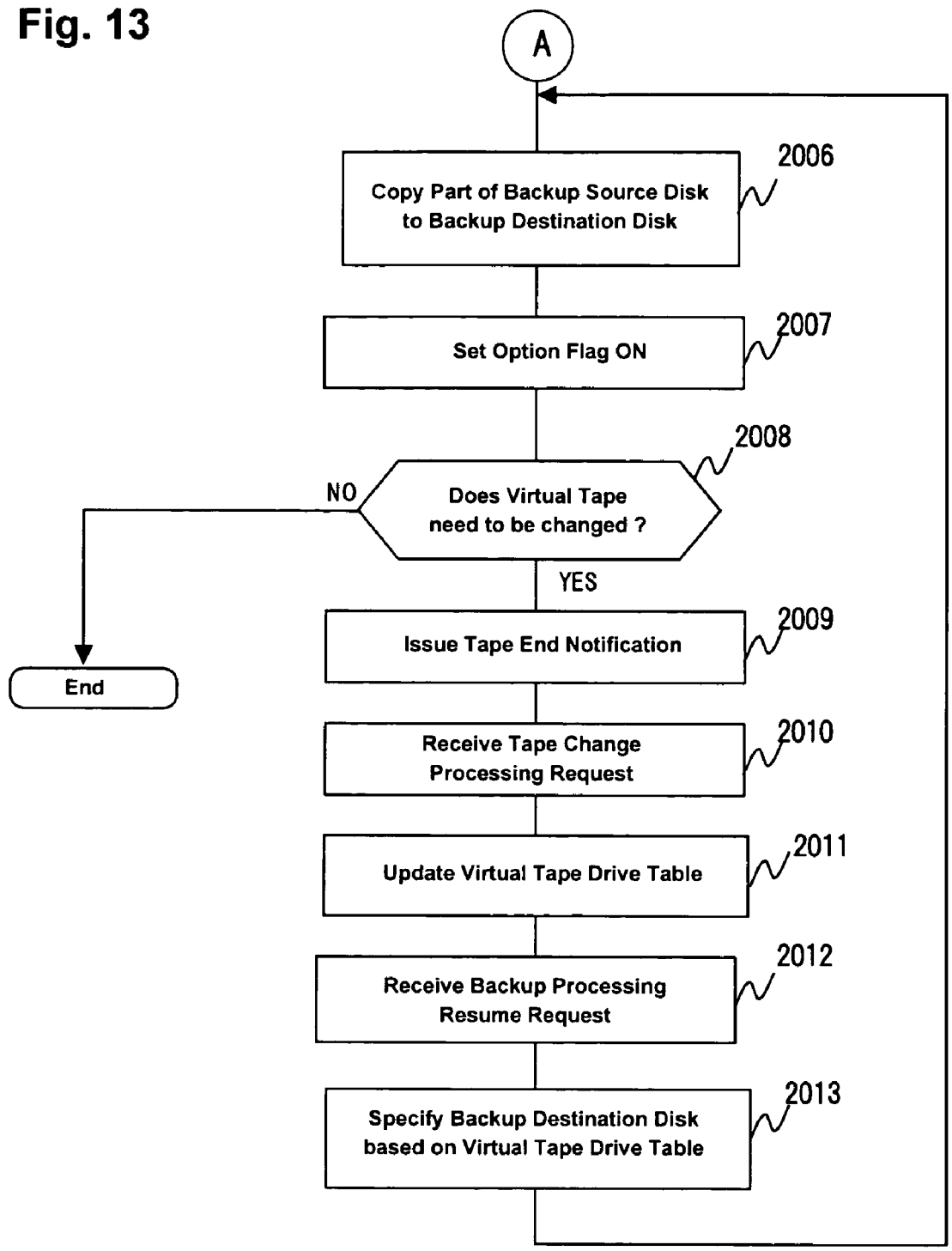
FIG. 13 shows a flowchart of an example of the backup processing.

FIGS. 12 and 13 indicate diagrams of an example of a processing executed primarily by the backup service 69 in a backup processing of NAS data. The first processing to take place in the backup processing is a virtual tape loading processing, as in the processing shown in FIG. 11. For this reason, in the backup processing shown in FIGS. 12 and 13, the block I/O receiving section 68 and the virtual tape library section 114 perform a processing similar to the processing in steps 1501 and 1502 in FIG. 11 to prepare the virtual tape.

Next, the backup service 69 receives from the backup server 31 a command instructing a backup. At the same time, the backup service 69 receives the name of the file system to be backed up and information regarding the virtual tape drive to be used in the backup through such means as command parameters or environmental variables (step 2001).

In step 2002, the backup service 69 searches, from the mounting names 206 of the disk management table 200, for the name of the file system to be backed up that was received in step 2001, and specifies the device number to be backed up.

In step 2003, the backup service 69 refers to the virtual tape drive table 230 and obtains, based on the information regarding the virtual tape drive to be used in the backup and received in step 2001, the tape number of the tape currently loaded in the virtual tape drive. The backup service 69 then refers to the virtual tape management table 210 and obtains, based on the tape number, the device number of the disk 16 that corresponds to the virtual tape. At this time, the backup service 69 sets the value of the corresponding option flag 218 to 1 in the virtual tape management table 210 as a flag indicating the virtual tape as the tape to be used in the backup of NAS data.

In step 2004 and subsequent steps, the backup service 69 instructs the disk system 1 to activate the mirror/split section 112, in order to utilize the mirror/split section 112 of the disk system 1 to execute a copy processing from the disk 16 to be backed up to the disk 16 comprising the virtual tape, which is the backup destination. The mirror/split section 112 can create copies not only of an entire disk 16, but also of specific regions of one of the disks 16. Consequently, when issuing a copy instruction, the backup service 69 designates the backup start LBA and end LBA of the backup source disk 16 (i.e., a NAS device) and the start LBA and end LBA of the backup destination disk 16 (i.e., a virtual tape) in its instruction to activate the mirror/split section 112.

In step 2004, the backup service 69 first determines whether or not the capacity of the virtual tape is larger than the capacity of the disk 16 to be backed up. If it is larger, the backup service 69 instructs the disk system 1 to copy all data stored on the backup source disk 16 to the backup destination disk 16 (step 2005).

If the capacity of the virtual tape is smaller than the capacity of the backup source disk 16, the processing proceeds to the processing beginning with step 2006, which is a copy processing of backup data spanning a plurality of virtual tapes. The processing beginning with step 2006 is described using FIG. 13.

In step 2006, the backup service 69 instructs the disk system 1 to copy data stored in a part of the storage regions of the backup source disk 16 to the backup destination disk 16 that makes up a virtual tape. The copy size is matched to the size of the virtual tape.

In step 2007, the backup service 69 sets the option flag 218 corresponding to the backup destination virtual tape in the virtual tape management table 210 to 2. The option flag 218 has the value 1 or 2 when NAS data is backed up on the corresponding virtual tape. When the backup data obtained by the backup service 69 cannot be stored on one virtual tape, the value of the option flag 218 becomes 2; when the backup data can be stored on one virtual tape, the value of the option flag 218 becomes 1.

In step 2008, the backup service 69 determines whether a virtual tape replacement processing is required. If there is data on the backup source disk 16 that has not yet been copied to a virtual tape, it is determined that the virtual tape must be replaced.

If a virtual tape replacement is required, the processing proceeds to step 2009, where the backup service 69 notifies the backup server 31 that the current virtual tape has reached its end. Upon receiving this notice, the backup server 31 issues a request for a tape replacement processing to the storage device system 0, and the backup service 69 receives the request (step 2010). This request is specifically realized by the backup server 31's issuing a MOVE MEDIUM command or an EXCHANGE MEDIUM command.

In step 2011, the virtual tape library section 114, upon receiving a command such as the MOVE MEDIUM command or the EXCHANGE MEDIUM command from the backup service 69, updates the virtual tape drive table 230. This processing is virtually identical to step 1502 in FIG. 11.

When the backup service 69 receives in step 2012 a request to resume the backup processing from the backup server 31, the backup service 69 resumes the backup processing.

In step 2013, a processing similar to the processing in step 2003 is executed, and the disk 16 that comprises a virtual tape is specified. Subsequently, the processing returns to step 2006 to repeat the processing to copy data stored on the backup source disk 16 to the disk 16 comprising the virtual tape, as well as the virtual tape replacement processing, until all data stored on the backup source disk 16 is copied onto virtual tapes.

Figure 14:
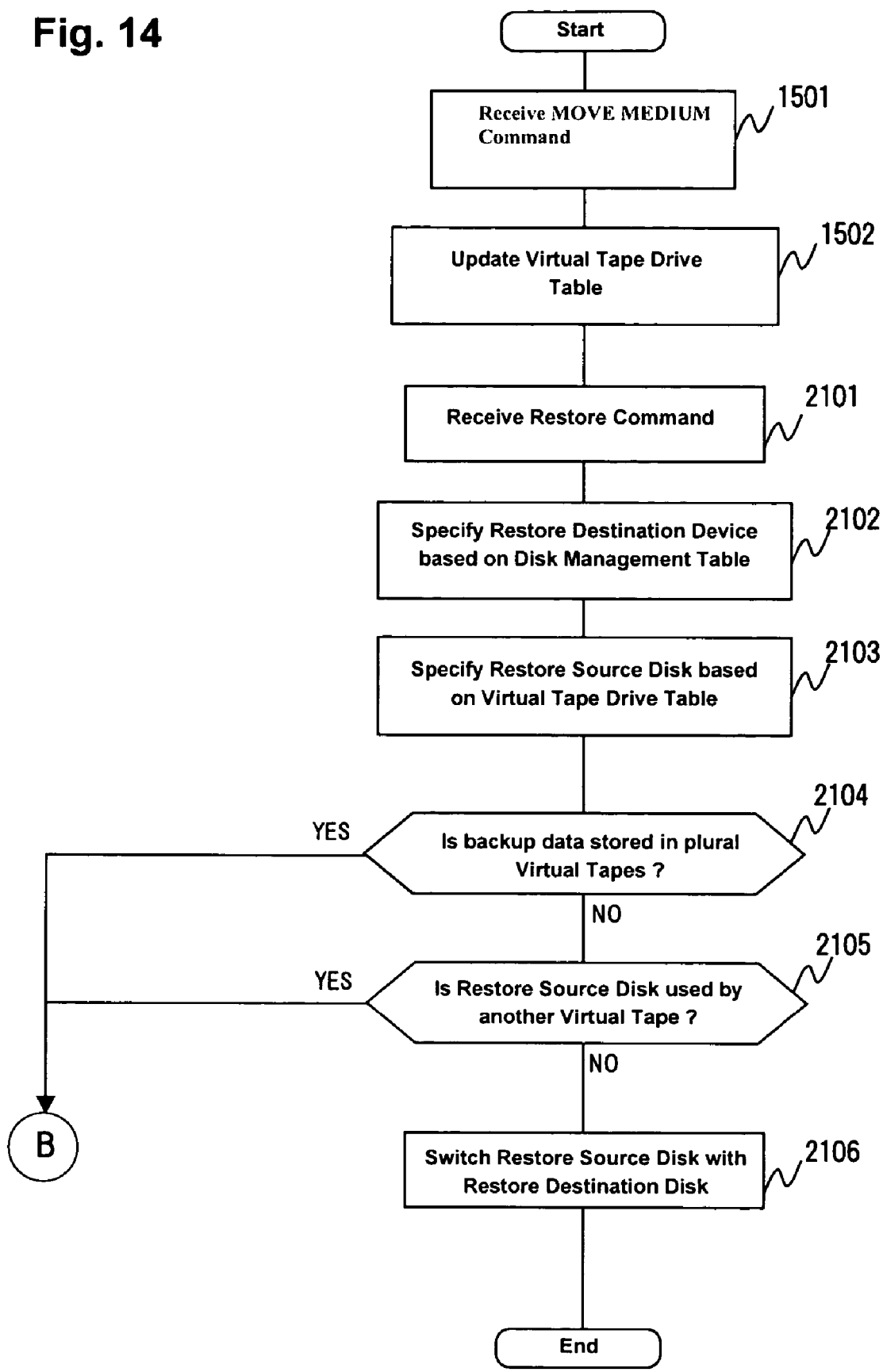
FIG. 14 shows a flowchart of an example of a processing to restore data from a virtual tape to a disk that belongs to the file system group 162.
Figure 15:
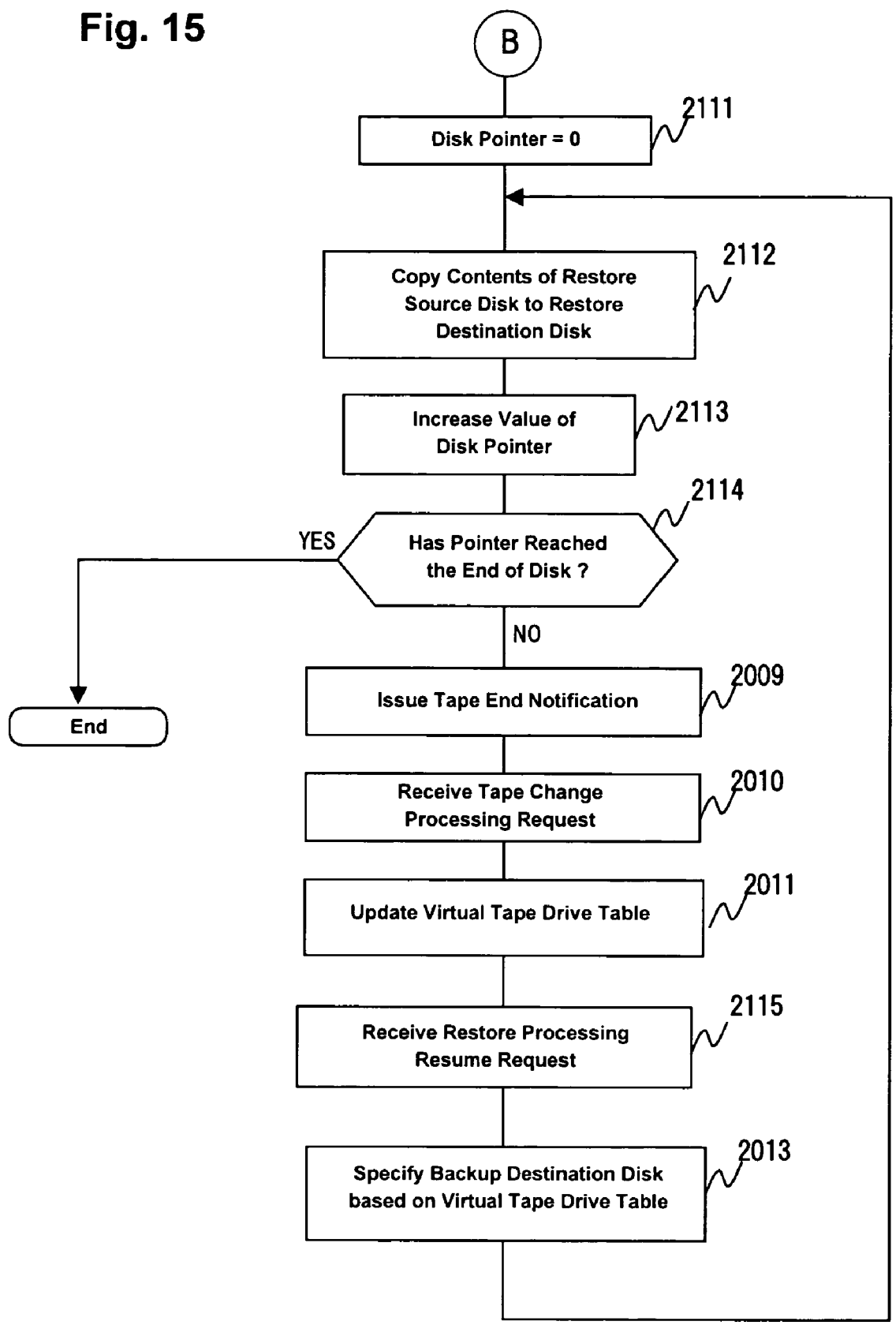
FIG. 15 shows a flowchart of an example of a processing to restore data from a virtual tape to a disk that belongs to the file system group 162.

Next, referring to FIGS. 14 and 15, a description is made as to the flow of a processing by the backup service 69 when restoring NAS data from a virtual tape to an NAS device that belongs to the file system group 162.

In the restore processing, the virtual tape loading processing is performed as in the backup processing shown in FIGS. 12 and 13. For this reason, first, the processing that takes place in steps 1501 and 1502 in FIG. 11 is performed to prepare a virtual tape. After the preparation of the virtual tape is completed, the backup service 69 receives a restore command from the backup server 31 (step 2101), which begins the restore processing by the backup service 69.

Steps 2102 and 2103 are virtually identical to steps 2002 and 2003, respectively, in FIG. 12, and serve to specify the restore destination disk 16 and the disk 16 that comprises the restore source virtual tape.

In step 2104, the backup service 69 checks the option flag 218 of the virtual tape management table 210 in order to determine whether backup data, i.e. data currently stored on virtual tape and to be restored, is stored on a plurality of virtual tapes.

If the backup data is not stored on a plurality of virtual tapes, the processing proceeds to step 2105, where the backup service 69 refers to the virtual tape management table 210 to check whether there are other virtual tapes defined on the disk 16 that comprises the virtual tape in question.

If there are no other virtual tapes defined on the disk 16 that comprises the virtual tape in question, there should only be the data to be restored on the disk 16; consequently, the restore processing can be completed by simply changing the disk 16 into an NAS device that belongs to the file system group 162. To this end, in step 2106, the backup service 69 switches the disk 16 storing the restore source data, which is currently managed by the virtual tape management table 210, with the restore destination disk 16, which is currently managed by the disk management table 200; this realizes a processing equivalent to the restore processing, and the restore processing ends. Specifically, the backup service 69 switches the device number that corresponds to the restore source virtual tape registered in the virtual tape management table 210 with the device number that corresponds to the restore destination NAS device registered in the disk management table 200, and registers in the virtual tape management table 210 the device number of the disk 16 currently managed as an NAS device and registers in the disk management table 200 the device number of the disk 16 currently managed as a virtual tape.

When the restore processing ends, the disk 16 that was used as a virtual tape before restoration becomes available for access from the NAS clients 3, while the disk 16 that was formerly available for access from the NAS clients 3 is now treated as a virtual tape.

If in step 2104 the backup data is determined to be stored spanning a plurality of virtual tapes, or if in step 2105 it is determined that other virtual tapes are defined on the disk 16 that comprises the restore source virtual tape, the processing beginning with step 2111 in FIG. 15 takes place.

Beginning with step 2111, the data copy processing from the restore source disk 16 to the restore destination disk 16 is performed using the mirror/split section 112 of the disk system 1, as in the backup processing shown in FIGS. 12 and 13. Since a plurality of disk-to-disk copy will be performed, the backup service 69 prepares and manages a disk pointer for storing copy positions.

In step 2111, the backup service 69 initializes the disk pointer value to 0. Next, in step 2112, the backup service 69 instructs the disk system 1 to activate the mirror/split section 112 to copy data stored on the restore source disk 16 to a restore destination disk 16. A copy instruction is issued by the backup service 69 to the disk system 1, assuming that at this time the copy beginning position (in other words, the position at which writing the backup data begins) on the restore destination disk 16 is an LBA indicated by the disk pointer and that the copy size is identical to the volume of the virtual tape.

In step 2113, the backup service 69 increases the value of the disk pointer by the number of blocks equivalent to the volume of the virtual tape. In step 2114, the backup service 69 determines whether the disk pointer has reached the end of the restore destination disk 16; it the disk pointer has reached the end of the disk 16, the restore processing ends.

If the disk pointer has not reached the end of the restore destination disk 16, the virtual tape must be replaced to continue the restore processing; the backup service 69 consequently notifies the backup server 31 that the tape has reached its end (step 2009), and a virtual tape replacement processing according to an instruction from the backup server 31 takes place (steps 2010 and 2011). This processing is identical to the processing that takes place from steps 2009 to 2011 in FIG. 13.

When the virtual tape replacement processing ends, the backup service 69 receives a request to resume the restore processing from the backup server 31 (step 2115), and specifies the disk 16 that comprises the restore source virtual tape based on the request received to resume restore processing (step 2013). Subsequently, the processing returns to step 2112, and the processing beginning with step 2112 is repeated until all backup data to be restored is restored.

Figure 16:
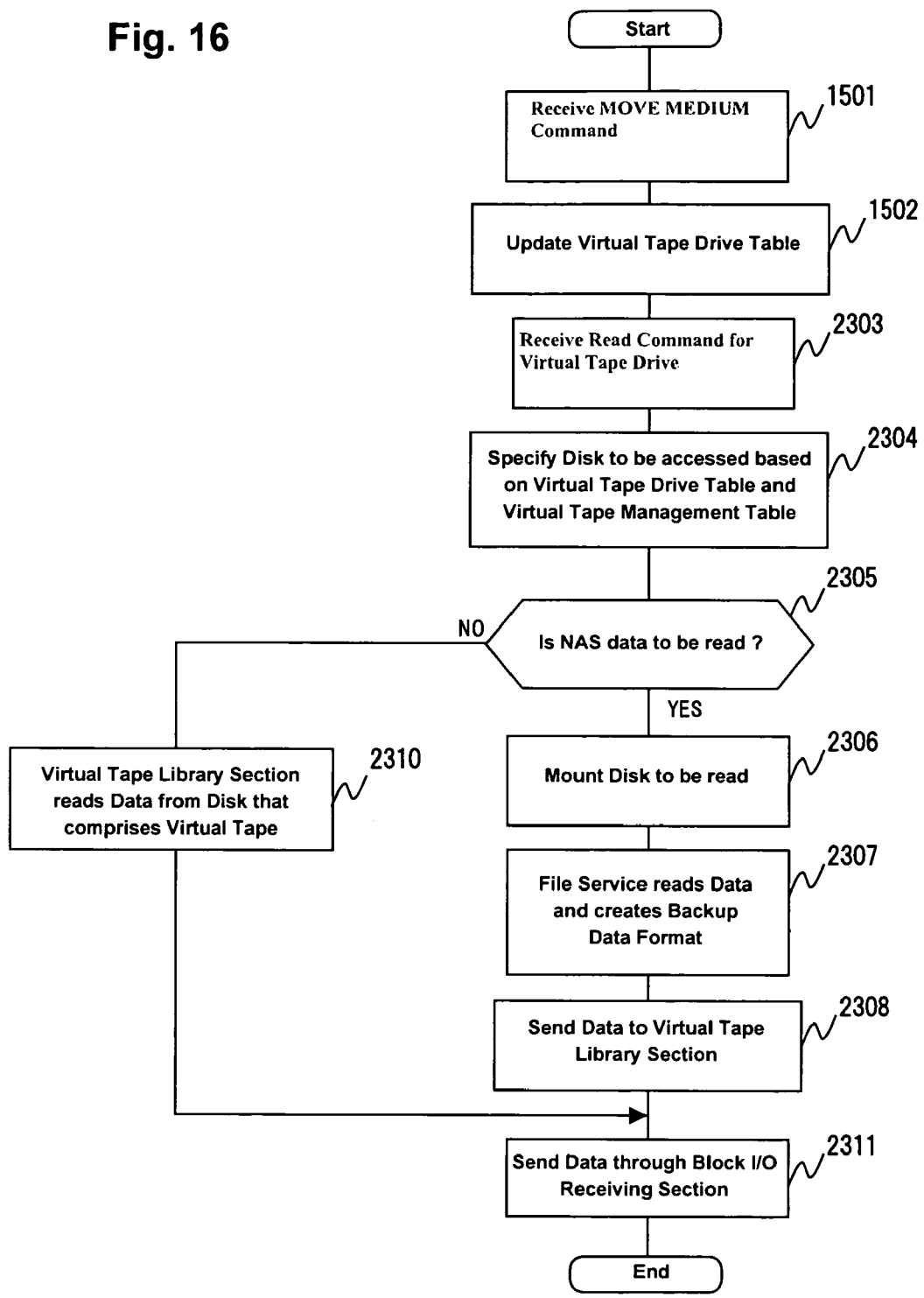
FIG. 16 shows a flowchart of an example of a processing to read data from a virtual tape library.

FIG. 16 describes the flow of a processing for one of the hosts 2 to read the content of a virtual tape that is a backup of NAS data, i.e., the content of one of the disks 16 that belongs to the file system group 162. Steps 1501 and 1502 are the preparation processing, such as loading of a virtual tape, and are the same as the processing that takes place in steps 1501 and 1502 in the processing to write to a virtual tape shown in FIG. 11.

Next, in step 2303, the block I/O receiving section 68 receives a read command for a virtual tape drive from one of the hosts 2. The read command is then sent to the virtual tape library section 114; in step 2304, the virtual tape library section 114 refers to the virtual tape drive table 230 and the virtual tape management table 210 and specifies, based on the drive number designated in the read command, the device number of the disk 16 that corresponds to the virtual tape to be accessed.

In step 2305, the virtual tape library section 114 determines whether the content of the virtual tape to be read is a backup of data on one of the disks 16 that belongs to the file system group 162 (i.e., NAS data). This determination can also be made by referring to the option flag 218 of the virtual tape management table 210.

To read the backup content of NAS data, the file service 69 in step 2306 mounts the disk 16 that comprises the virtual tape and makes the disk 16 available for access as a file system. In step 2307, the file service 31 reads data from the disk 16, creates data in general backup format, such as tar format, and sequentially sends data to the virtual tape library section 114 (step 2308); and the virtual tape library section 114 sends the data to the host 2 via the block I/O receiving section 68 (step 2311).

If it is determined in step 2305 that the processing is not a processing to read backup data of NAS data, the processing proceeds to step 2310, where the virtual tape library section 114 reads the data using a normal method. In other words, in step 2310, the virtual tape library section 114 reads data from the disk 16 that comprises the virtual tape and sends the data read without any alterations to the host 2 via the block I/O receiving section 68.

According to the embodiment described, the disk system 1 and the front end server 6 realize the storage device system 0 that has the functions of a disk device, a file server and a tape library; however, the configuration is not necessarily limited to the configuration shown in FIG. 1. For example, a mode in which the disk system 1 and the front end server 6 in FIGS. 1 and 2 may be mounted on one device, or a mode in which the file service 67 and/or the backup service 69 may operate on different devices, can be applications of the present invention.

According to the storage device system described above, not only a tape device but a library device with a library mechanism can be emulated, which makes it possible to maintain and manage large capacity tape media on a storage device with magnetic disks.

Furthermore, disks can be treated either as magnetic disks or virtual tapes; since disks that are treated as magnetic disks can be changed to be treated as virtual tapes and disks that are treated as virtual tapes can conversely be changed to be treated as magnetic disks, capacities of magnetic disks and virtual tapes can be freely altered.

In addition, a disk device, a file service and a tape library device can be consolidated on a single storage device, and volume can be allocated freely among the three.

Moreover, due to the fact that a data copy function of the disk device can be utilized in the processing to make a backup on the virtual tape device and in the processing to restore data from the virtual tape device, there is no need to read data to a backup server when performing a backup processing or restore processing; this consequently makes high-speed and low-load backup processing and restore processing possible. By realizing the restore processing from a virtual tape to a magnetic disk through making changes in mappings of the virtual tape and the disk, the restore processing can be executed at high-speed and low-load.

In a storage device system with magnetic tapes in accordance with the present invention, a storage device that emulates a tape library device and that has both the functions of magnetic disks and virtual tapes can be realized. Further, a high-speed backup processing and restore processing can be realized using virtual tapes.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A virtual tape library system comprising:
   a storage device system connected to a host computer, wherein the storage device system includes:
      a plurality of logical disks, each of which is configured by storage devices of a single type, said single type of storage device being a magnetic disk type storage device; and a controller which is configured to control the plurality of logical disks,
   wherein the plurality of logical disks includes plural first type logical disks, each of which is categorized in a first type group and controlled by the controller to emulate a magnetic tape and be thus provided to the host computer for access thereto as a magnetic tape, and plural second type logical disks, each of which is categorized in a second type group and not controlled by the controller to emulate a magnetic tape,
   wherein said controller is adapted to conduct different respective read/write procedures from/to said first and second type logical disks based on whether a storage device system access request received from the host computer is formatted for a magnetic tape or for a magnetic disk, said different respective read/write procedures including a first read/write procedure from/to one of said first type logical disks when a storage device system access request is a tape access request formatted for a magnetic tape, and a second read/write procedure from/to one of said second type logical disks when a storage device system access request is a disk access request formatted for a magnetic disk,
   wherein in conducting the first read/write procedure, the controller converts a tape access request into a disk access request and accesses, in disk format, a physical magnetic disk in the first type logical disks that emulates a tape device, and
   wherein in conducting the second read/write procedure, the controller accesses, in disk format, a physical magnetic disk in the second type logical disks that does not emulate a tape device.

2. A virtual tape library system according to claim 1, wherein the controller is configured to receive a move command to load a magnetic tape to a tape drive, associate one first type logical disk with an ID of the tape drive according to the move command, receive a write command including the ID of the tape drive to write data to a magnetic tape, select the first type logical disk associated with the ID of the tape drive, and write data into the selected first type logical disk.

3. A virtual tape library system according to claim 2, wherein the controller is configured to change a category of a logical disk between the first type group and the second type group.

4. A virtual tape library system according to claim 1, wherein a backup data of data stored in a second type logical disk is stored in a first type logical disk.

5. A virtual tape library system according to claim 4, wherein data of a file system under control of the controller is stored in the plural second type logical disks.

6. A virtual tape library system according to claim 5, wherein the controller is configured to receive a move command to load a magnetic tape to a tape drive, associate one first type logical disk with an ID of the tape drive according to the move command, receive a backup command and a file system name representing a target file system of the backup, select one second type logical disk based on the received file system name, select the first type logical disk associated with the ID of the tape drive, and control to copy data from the selected second type logical disk to the selected first type logical disk.

7. A virtual tape library system according to claim 6, wherein the controller includes a mirror section to replicate data of one logical disk to another logical disk, and the mirror section is configured to replicate data of the selected second type logical disk to the selected first type logical disk according to the backup command.

8. A virtual tape library system according to claim 4, wherein the controller is further configured to change a category of a logical disk from the first type group to the second type group to restore the backup data stored in the first type logical disk.

9. A virtual tape library system according to claim 8, wherein the controller is configured to receive a move command to load a magnetic tape storing the backup data to a tape drive, associate one first type logical disk storing the backup data with an ID of the tape drive according to the move command, receive a restore command, select one second type logical disk, select the first type logical disk associated with the ID of the tape drive, change a category of the selected second type logical disk from the second type group to the first type group, and change a category of the selected first type logical disk from the first type group to the second type group, so that the backup data stored in the selected first type logical disk is restored.

10. A virtual tape library system according to claim 4, wherein the controller is configured to receive a restore command, and copy the backup data stored in the first type logical disk, which is associated with an ID of a tape drive, to a second type logical disk, so that the backup data is restored to the second type logical disk.

11. A virtual tape library system according to claim 10, wherein if the backup data is stored in plural first type logical disks, the controller is configured to change the first type logical disk associated with the ID of the tape drive to another first type logical disk, and copy the backup data stored in the another first type logical disk to the second type logical disk.

12. A virtual tape library system comprising:
   a plurality of logical disks, each of which is configured by at least one magnetic disk; and
   a controller which is configured to control the plurality of logical disks,
   wherein the plurality of logical disks includes plural first type logical disks, each of which is categorized in a first type group and controlled to emulate a magnetic tape by the controller, and plural second type logical disks, each of which is categorized in a second type group and not controlled to emulate a magnetic tape,
   wherein said controller is adapted to conduct different respective read/write procedures from/to said first and second type logical disks based on whether a received command is targeted to a magnetic tape, including a first read/write procedure from/to one of said first type logical disks when a received command is targeted to a magnetic tape, and a second read/write procedure from/to one of said second type logical disks when a received command is not targeted to a magnetic tape, wherein a backup data of data stored in a second type logical disk is stored in a first type logical disk, wherein data of a file system under control of the controller is stored in the plural second type logical disks, wherein the controller is configured to receive a move command to load a magnetic tape to a tape drive, associate one first type logical disk with an ID of the tape drive according to the move command, receive a backup command and a file system name representing a target file system of the backup, select one second type logical disk based on the received file system name, select the first type logical disk associated with the ID of the tape drive, and control to copy data from the selected second type logical disk to the selected first type logical disk, and wherein if the data size of the target file system of the backup is larger than the capacity of the selected first type logical disk, the controller is configured to change the selected first type logical disk to another first type logical disk during the backup procedure.

13. A method for using a storage device system, which comprises a controller and a plurality of physical disks under control of the controller, the method comprising steps of:

configuring a plurality of logical disks from the plurality of physical disks wherein each logical disk is configured by storage devices of a single type, said single type of storage device being a magnetic disk type storage device;

assigning at least one of said logical disks to a first group;

controlling, by said controller, each said logical disk categorized in the first group to emulate a magnetic tape and be thus provided for access thereto as a magnetic tape;

assigning at least one of said logical disks to a second group, said second group including at least one logical disk not controlled by said controller to emulate a magnetic tape; and conducting a read/write procedure from/to one of said first and second type logical disks in response to a received storage device system access request, said read/write procedure being determined based on whether the received storage system device access request if formatted for a magnetic tape or to a magnetic disk, such that a first read/write procedure from/to one of said first type logical disks is conducted by the controller when the received storage device system access request is a tape access request formatted for a magnetic tape, and a second read/write procedure from/to one of said second type logical disks is conducted when the received storage device system access request is a disk access request formatted for a magnetic disk, wherein in conducting the first read/write procedure, the controller converts a tape access request into a disk access request and accesses, in disk format, a physical magnetic disk in the first type logical disks that emulates a tape device, and wherein in conducting the second read/write procedure, the controller accesses, in disk format, a physical magnetic disk in the second type logical disks that does not emulate a tape device.

14. A method for using a storage system according to claim 13, wherein the second group includes a logical disk storing data of a file system and a logical disk not storing data of a file system.

15. A method for using a storage system according to claim 13, further comprising a step of:

copying data stored in a logical disk categorized in the second group to a logical disk categorized in the first group, so that the backup data of the logical disk categorized in the second group is stored in the logical disk categorized in the first group.

16. A method for using a storage system according to claim 15, wherein the logical disk categorized in the second group stores data of a file system, and the backup data of the file system is stored in the logical disk categorized in the first group by the step of copying data.

17. A method for using a storage system according to claim 16, wherein the step of copying data comprises steps of:

associating one logical disk categorized in the first group with an ID of a tape drive;

specifying one logical disk categorized in the second group, which stores data of a backup target file system; and copying data from the specified logical disk categorized in the second group to the logical disk categorized in the first group and associated with the ID of the tape drive.

18. A method for using a storage system according to claim 13, further comprising a step of:

changing a category of the logical disk storing the backup data from the first group to the second group, so that the backup data stored in the logical disk is restored.

19. A method for using a storage system according to claim 15, further comprising a step of:

copying the backup data stored in the logical disk categorized in the first group and associated with an ID of a tape drive to a logical disk categorized in the second group, so that the backup data is restored to the logical disk categorized in the second group.

20. A method for using a storage system which comprises a controller and a plurality of physical disks under control of the controller, the method comprising steps of:

configuring a plurality of logical disks from the plurality of physical disks;

assigning at least one of said logical disks to a first group;

controlling each said logical disk categorized in the first group to emulate a magnetic tape;

assigning at least one of said logical disks to a second group, said second group including at least one logical disk not controlled to emulate a magnetic tape;

conducting a read/write procedure from/to one of said first and second type logical disks in response to a received command, said read/write procedure being determined based on whether the received command is targeted to a magnetic tape, such that a first read/write procedure from/to one of said first type logical disks is conducted when the received command is targeted to a magnetic tape, and a second read/write procedure from/to one of said second type logical disks is conducted when the received command is not targeted to a magnetic tape; and copying data stored in a logical disk categorized in the second group to a logical disk categorized in the first group, so that the backup data of the logical disk categorized in the second group is stored in the logical disk categorized in the first group, wherein the logical disk categorized in the second group stores data of a file system, and the backup data of the file system is stored in the logical disk categorized in the first group by the step of copying data, wherein the step of copying data comprises steps of:

associating one logical disk categorized in the first group with an ID of a tape drive;

specifying one logical disk categorized in the second group, which stores data of a backup target file system; and copying data from the specified logical disk categorized in the second group to the logical disk categorized in the first group and associated with the ID of the tape drive, and wherein if the data size of the backup target file system is larger than the capacity of the logical disk categorized in the first group and associated with the ID of the tape drive, the step of copying data further comprises steps of:

selecting another logical disk categorized in the first group; and associating the another logical disk with the ID of the tape drive instead of the logical disk categorized in the first group and currently associated with the ID of the tape drive.

* * * * *